United States Patent
Lindsley et al.

(10) Patent No.: US 7,592,392 B2
(45) Date of Patent: Sep. 22, 2009

(54) SYNTHESIS OF FUNCTIONAL POLYMERS FOR USE IN ORGANIC SYNTHESIS AND COMBINATORIAL CHEMISTRY

(75) Inventors: Craig W. Lindsley, Schwenksville, PA (US); David D. Wisnoski, Lansdale, PA (US)

(73) Assignee: Merck & Co. Inc., Rahway, NJ (US)

( * ) Notice: Subject to any disclaimer, the term of this patent is extended or adjusted under 35 U.S.C. 154(b) by 598 days.

(21) Appl. No.: 10/551,011

(22) PCT Filed: Mar. 31, 2004

(86) PCT No.: PCT/US2004/011663

§ 371 (c)(1),
(2), (4) Date: Sep. 29, 2005

(87) PCT Pub. No.: WO2004/089857

PCT Pub. Date: Oct. 21, 2004

(65) Prior Publication Data

US 2006/0189764 A1    Aug. 24, 2006

Related U.S. Application Data

(60) Provisional application No. 60/460,292, filed on Apr. 4, 2003.

(51) Int. Cl.
*C08L 51/04* (2006.01)
*C08F 255/08* (2006.01)
*C08F 257/02* (2006.01)
*C08F 287/00* (2006.01)

(52) U.S. Cl. .............. 525/69; 525/71; 525/259; 525/316; 522/149; 522/150; 522/155; 522/156; 522/157; 522/161; 526/204; 526/220

(58) Field of Classification Search .............. 525/69, 525/71, 259, 316; 522/149, 150, 155, 156, 522/157, 161; 526/204, 220
See application file for complete search history.

(56) References Cited

FOREIGN PATENT DOCUMENTS

WO    WO 00/78740    12/2000

OTHER PUBLICATIONS

McAlpine, S. R., et al. J. Comb. Chem. , vol. 3(1), pp. 1-5, (2001).
Lindsley, C.W., et al. J. Comb. Chem., vol. 2, pp. 550-559 (2000).
Hodges, J.C., et al. J. Comb. Chem., vol. 2. p. 80-88 (2000).
Booth, R. J., et al. J. Am. Chem. Soc., vol. 119. pp. 4882-4886 (1997).
"Rasta Resons from Sigma-Aldrich", Aldrichimica Acta, vol. 38 (1), pp. 17 (2005).
Ley, S.V., Journal of the Chemical Society Perkin Transactions 1, vol. 1, pp. 3815 (2000).

*Primary Examiner*—Nathan M Nutter
(74) *Attorney, Agent, or Firm*—David A. Muthard

(57) ABSTRACT

The present invention relates to a novel process for the preparation of solid-supported scavenging reagents and solid-supported functional polymers. The invention further relates to novel solid-supported functional polymers and to their use in organic synthesis and combinatorial chemistry.

11 Claims, No Drawings

SYNTHESIS OF FUNCTIONAL POLYMERS FOR USE IN ORGANIC SYNTHESIS AND COMBINATORIAL CHEMISTRY

PRIORITY CLAIM

This application is a §371 application of PCT/US2004/01163 that was filed on Mar. 31, 2004, which claims priority from the U.S. Provisional Application No. 60/460,292, filed on Apr. 4, 2003, now expired.

The present invention relates to a novel process for the preparation of solid-supported scavenging reagents and solid-supported functional polymers. The invention further relates to novel solid-supported functional polymers and to their use in organic synthesis and combinatorial chemistry.

BACKGROUND OF THE INVENTION

Organic synthesis has proven to be a highly effective means for preparation of molecules with useful biological activities which may be employed in the treatment of human, animal, and plant diseases. Combinatorial chemistry is a means of performing many organic syntheses concurrently or in parallel arrays, thereby increasing the rate at which compounds may be synthesized. In the preparation of biologically active molecules via organic synthesis or combinatorial chemistry, a multi-step organic synthesis is usually required. Each step consists of reacting various chemicals to produce a product which is normally purified before continuing with the next step. Purification is typically the most time consuming part of organic synthesis. The time spent on purification is especially critical in combinatorial chemistry since hundreds or even thousands of reactions are often carried out in parallel. Thus, methods which enable simple, rapid and readily automated purification are of value to the practice of both organic synthesis and combinatorial chemistry.

Solid-supported reagents which cause a chemical transformation of a compound in solution provide a convenient and rapid means of purification since they can be removed from the desired product by filtration. Solid-supported reagents are typically prepared by chemical reactions that attach individual molecules of the desired reagent to a preformed solid support either by covalent bonding or ionic interaction.

Solid-supported scavenging reagents also provide a convenient and rapid means of purification since they selectively react with certain components of a mixture in solution, thereby removing them from solution to the solid phase where they can be easily separated from the unbound components by filtration. A solid-supported scavenger may be used in one of two ways. First, it can be designed to selectively react with excess starting materials or other reactive impurities which contaminate the solution of a desired product. The resin and the sequestered contaminants are subsequently removed by filtration. Second, the scavenger resin can also be designed to selectively react with the desired product. With the product sequestered on the resin, any contaminants may be rinsed away. The product is then chemically cleaved from the resin in a purified form. This latter use of a scavenging resin is often referred to as "catch and release." Solid-supported scavenging reagents are typically prepared by chemical reactions, which result in the covalent attachment of individual molecules of the scavenger reagent to a pre-formed solid support.

Aqueous suspension polymerization requires that any functionality on the monomers not be reactive with water nor promote dissolution of the monomer in water. This limits the range of monomers that may be utilized.

For a comprehensive review of the existing state of the art with respect to solid-supported reagents, solid-supported scavengers and solid phase organic synthesis, see Obrecht D. and Villalgordo J. M., *Tetrahedron Organic Chemistry Series*, Volume 17, Solid-Supported Combinatorial and Parallel Synthesis of Small-Molecular-Weight Compound Libraries.

A disadvantage with some solid-supported reagents and solid-supported scavengers is their low loading of reactive groups per gram of solid support. For instance, an isocyanate scavenger resin with 1.1 mMol of isocyanate groups per gram of resin has recently been described (Booth R. J. and Hodges J. C., Polymer-Supported Quenching Reagents for Parallel Purification, *J. Am. Chem. Soc.*, 1997; 119:4882-4886).

The synthesis of block co-polymers by living free-radical polymerization has been described in the literature. For a recent and comprehensive review on living free-radical polymerization see Malmstroem Eva E.; Hawker Craig J., Macromolecular engineering via "living" free-radical polymerizations, *Macromol. Chem. Phys.*, 1998; 199:923-935. One class of living free-radical polymerization reactions makes use of nitroxide reagents to initiate the reaction and cap the growing polymer chain. For example, 2,2,6,6-tetramethylpiperidine-N-oxyl (TEMPO), 4-hydroxy-2,2,6,6-tetramethylpiperidine-1-oxyl (OH-TEMPO), 4-oxo-2,2,6,6-tetramethylpiperidine-1-oxyl (oxo-TEMPO) and related 0-alkyl derivatives such as 1-Phenyl-1-(2',2',6',6'-tetramethyl-1'-piperidinyloxy)-ethane (1-Phenylethyl-TEMPO), are useful nitroxide reagents in living free-radical polymerization. A variety of useful nitroxide reagents are described by Chang Hun Han. Marco Drache, and Gudrun Schmidt-Naake in *Die Angewandte Makrornolekulare Chemie*, 1999; 264:73-81. A variety of useful alkoxyamines and their performance in living free radical polymerization reactions are described by Didier Benoit, Vladimir Chaplinski, Rebecca Brnslau and Craig J. Hawker in *The Journal of the American Chemical Society*, 1999; 121:3904-20.

The use of 1-Phenylethyl-TEMPO in a living free-radical polymerization as previously described usually involves heating the 1-Phenylethyl-TEMPO above 123° C. to cause it to reversibly fragment into a TEMPO radical and a phenylethyl radical. When this is done in the presence of an excess of styrene, the phenylethyl radical initiates polymerization of the styrene. Each molecule of 1-Phenylethyl-TEMPO grows one polymer chain of approximately 10 monomer units, the terminus of which is capped with a TEMPO residue. Subsequently, it is possible to use the first polymer as an initiator for an even larger polymer. Heating of the first polymer with excess 4-bromostyrene causes continued polymerization to give a polymer of approximately twice the number of monomer units in two blocks, one of which is polystyrene and the other of which is poly(4-bromostyrene). The term "living free-radical polymerization" arises from the potential ability to start, stop, and continue polymerization reactions in repeated cycles. The polymerization reaction "lives" a long time since chain termination reactions that would "kill" the polymerization reaction are inhibited by the presence of the TEMPO radical.

Preparation of other functional polymers have been described in the literature. An extensive review of functional polymer preparations has recently been edited by A. O. Patil, D. N. Schulz, and B. M. Novac (*Functional Monomers, Modern Synthetic Methods and Novel Structures*, ACS Symposium Series 704, The American Chemical Society, 1997, 347 pages).

Insoluble solid supports may be chemically modified to contain multiple cyclic nitroxide sites which can act as initiators to radical polymerization has recently been described (PCT Publ. WO 00/78740). Solid-supported functional polymers prepared from these solid-supported initiators are also described. The macromolecular structure of these solid-supported functional polymers (termed "Rasta resins" because of the schematic appearance of the hair-like appendages that represent the new block polymer growth) allows properties such as greater solvent accessibility to reaction sites and higher loading levels of reagent functionality compared to known solid-supported reagents, solid-supported scavengers, and supports for solid phase synthesis. However, lengthy reaction times are required to generate those solid-supported functional polymers. Furthermore, only modest loading levels were previously achieved for such polymers.

Recently, numerous examples of microwave-assisted protocols for organic synthesis have been described in the literature. However, microwave technology has not been applied to living free radical polymerization strategies in solution or on solid support.

SUMMARY OF THE INVENTION

The present invention provides a novel method of synthesis of high loading Rasta resins useful in solid supported living free radical polymerization (LFRP). The expedient microwave driven preparation of these high loading solid-supported functional polymers allows for broader incorporation of such reagents in the preparation of libraries of candidate pharmaceutical compounds by combinatorial synthesis techniques.

DETAILED DESCRIPTION OF THE INVENTION

The present invention is directed to a process for the preparation of a compound of the Formula I:

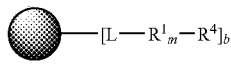

I wherein

is an insoluble solid support selected from the group consisting of: poly(styrene-divinylbenzene), macroreticular poly(styrene-divinylbenzene), polystyrene which is radiation grafted to polypropylene, polystyrene which is radiation grafted to polyethylene, polystyrene which is radiation grafted to poly(tetrafluoroethylene), and polystyrene which is radiation grafted to poly(ethylene-tetrafluoroethylene) wherein the insoluble solid support is in a shape selected from a bead, a tube, a rod, a ring, a disk, or a well; L is —$CH_2$—, —$C(CH_3)_2$—, —$CH(CH_3)$—, —$(CH_2)_n CH(CN)$—, —$(CH_2)_n CH(CO_2Me)$-, —$(CH_2)_n CH(Ph)$-, —$(CH_2)_n C(CH_3, Ph)$-, —$CH(CH_2CH_2Ph)$-, or

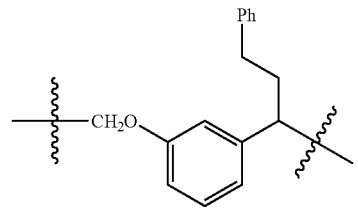

n is zero or an integer from 1 to 5;
m is zero or an integer from 1 to 100;
b is mMol content of initiator or solid-supported polymer per gram of insoluble solid support and is about 0.1 to about 5.0 mMol per gram;
$R^1$ is selected from:

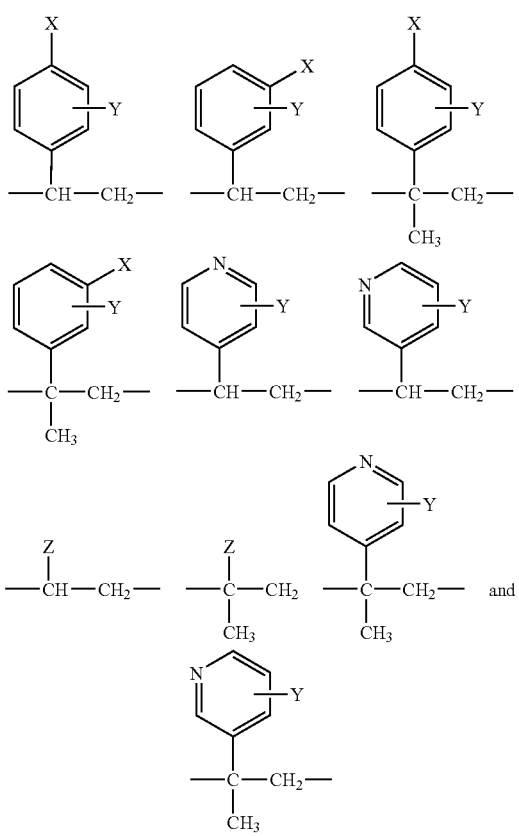

wherein
X is H, F, $(CH_2)_n Cl$, $(CH_2)_n Br$, $(CH_2)_n I$, $B(OH)_2$, $(CH_2)_n CH=CH_2$, NCO, $CH_2NCO$, $CH(CH_3)NCO$, $C(CH_3)_2NCO$, $CO_2Me$, $CO_2Et$, $CO_2$ (t-Bu), $CO_2H$, COCl, $CO_2CH(CF_3)_2$, $CO_2Ph$, $CO_2$(pentafluorophenyl), $CO_2$(pentachlorophenyl), $CO_2$ (N-succinimidyl), $C(OMe)_3$, $C(OEt)_3$, $(CH_2)_n OH$, $(CH_2)_n CH(OH)CH_2OH$, $(CH_2)_n SH$, $CH_2NHCH_2CH_2SH$, $(CH_2)_n NHC(=S)NH_2$, $(CH_2)_n NH_2$, $(CH_2)_n N(Me)_2$, $(CH_2)_n N(Et)_2$, $(CH_2)_n (iPr)_2$, $CH(CH_3)NH_2$, $C(CH_3)_2NH_2$, $CH_2NHCH_2CH_2NH_2$, $CH_2NHCH_2CH_2NHCH_2CH_2NH_2$, $CH_2N(CH_2CH_2NH_2)_2$, $CH_2NHCH_2CH_2N(CH_2CH_2NH_2)_2$, $CH_2N(CH_2CH_2OH)_2$, $(CH_2)_n$(morpholin-4-yl), $(CH_2)_n$(piperidin-1-yl), $(CH_2)_n$(4-methypiperazin-1-yl), $N(SO_2CF3)_2$, (CH$_2$)$_n$CHO, (CH$_2$)$_n$Si(Me)$_2$H, (CH$_2$)$_n$Si(Et)$_2$H, (CH$_2$)Si(iPr)$_2$H, (CH$_2$)$_n$Si(tBu)$_2$H, (CH$_2$)$_n$Si(Ph)$_2$H, (CH$_2$)$_n$Si(Ph)(tBu)H, (CH$_2$)$_n$Si(Me)$_2$Cl, (CH$_2$)$_n$Si(Et)$_2$Cl, (CH$_2$)$_n$Si(i-Pr)$_2$Cl, (CH$_2$)$_n$Si(tBu)$_2$Cl, (CH$_2$)$_n$Si(Ph)$_2$Cl, (CH$_2$)$_n$Si(tBu)(Ph)Cl, P(Ph)$_2$, P(o-tolyl)$_2$,

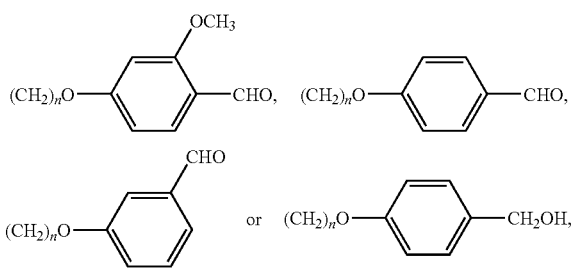

wherein n is zero or an integer from 1 to 5;
Y is H, Cl, Br, F, OH, or OMe;
Z is NCO, CO$_2$Me, CO$_2$Et, CO$_2$(i-Pr), CO$_2$(n-Bu), CO$_2$(t-Bu), CN, CO$_2$H, COCl, CO$_2$CH(CF$_3$)$_2$, CO$_2$(pentafluorophenyl), CO$_2$(pentachlorophenyl), CO$_2$Ph, CO$_2$(N-succinimidyl), C(OMe)$_3$, C(OEt)$_2$, CON(OCH$_3$)CH$_3$, CHO, CH$_2$OH, or C(CH$_3$)$_2$OH; and
R$^4$ is

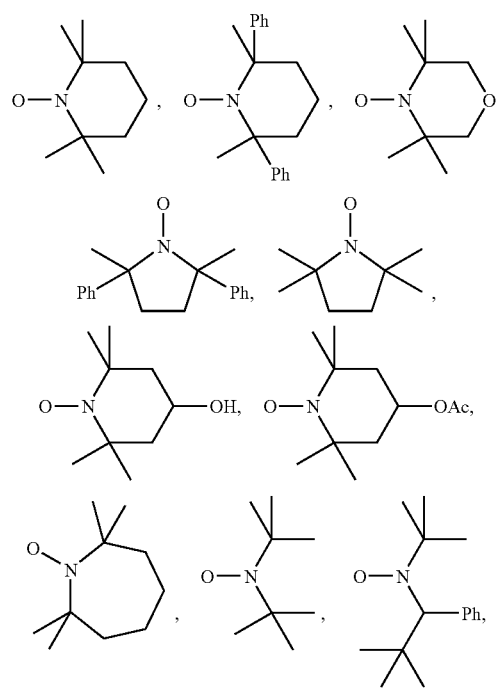

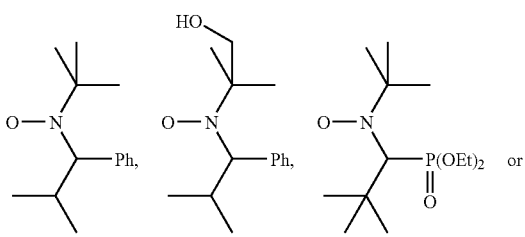

-continued

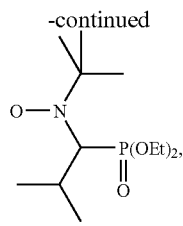

which comprises the step of microwave irradiating a mixture comprising a compound of the formula II

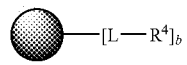

II and a compound III selected from:

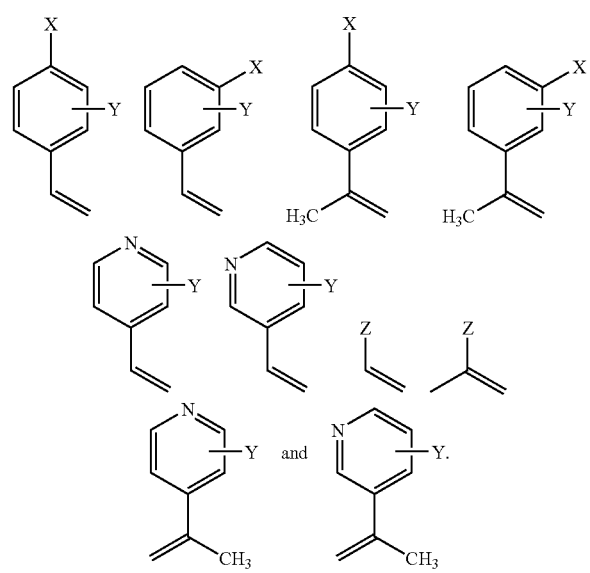

In another embodiment, the invention is directed to a process for the preparation of a compound of the Formula IV:

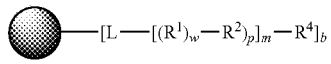

IV wherein

is an insoluble solid support selected from the group consisting of: poly(styrene-divinylbenzene), macroreticular poly(styrene-divinylbenzene), polystyrene which is radiation grafted to polypropylene, polystyrene which is radiation grafted to polyethylene, polystyrene which is radiation grafted to poly(tetrafluoroethylene), and polystyrene which is radiation grafted to poly(ethylene-tetrafluoroethylene) wherein the insoluble solid support is in a shape selected from a bead, a tube, a rod, a ring, a disk, or a well; L is —CH$_2$—, —C(CH$_3$)$_2$—, —CH(CH$_3$)—, —(CH$_2$)$_n$CH(CN)—, —(CH$_2$)$_n$CH(CO$_2$Me)-, —(CH$_2$)$_n$CH(Ph)-, —(CH$_2$)$_n$C(CH$_3$, Ph)-, —CH(CH$_2$CH$_2$Ph)-, or

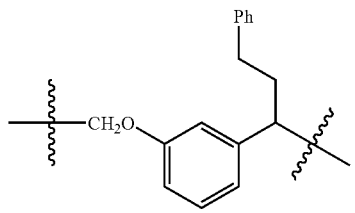

n is zero or an integer from 1 to 5;
m is zero or an integer from 1 to 100;
w is an integer from 1 to 10;
p is zero or an integer from 1 to 10;
b is mMol content of initiator or solid-supported polymer per gram of insoluble solid support and is about 0.1 to about 5.0 mMol per gram;
R$^1$ and R$^2$ are each independently the same or different and are selected from

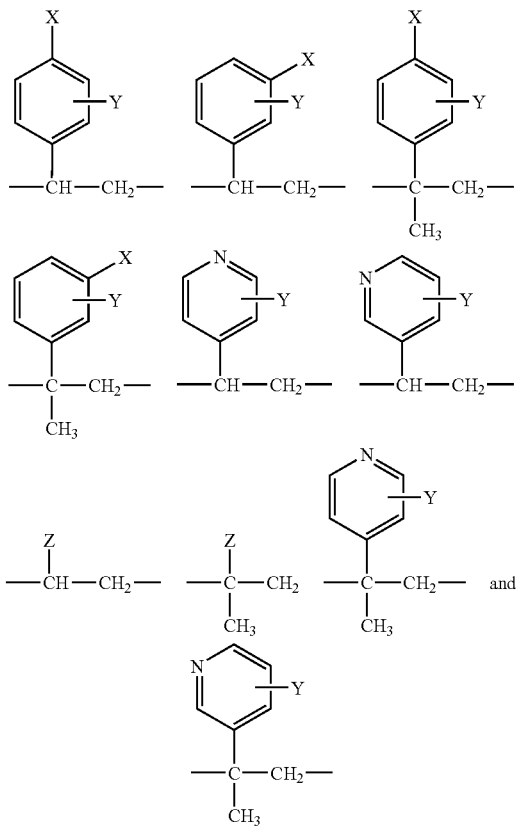

wherein
X is H, F, (CH$_2$)$_n$Cl, (CH$_2$)$_n$Br, (CH$_2$)$_n$I, B(OH)$_2$, (CH$_2$)$_n$CH=CH$_2$, NCO, CH$_2$NCO, CH(CH$_3$)NCO, C(CH$_3$)$_2$NCO, CO$_2$Me, CO$_2$Et, CO$_2$(t-Bu), CO$_2$H, COCl, CO$_2$CH(CF$_3$)$_2$, CO$_2$Ph, CO$_2$(pentafluorophenyl), CO$_2$(pentachlorophenyl), CO$_2$(N-succinimidyl), C(OMe)$_3$, C(OEt)$_3$, (CH$_2$)$_n$OH, (CH$_2$)$_n$CH(OH)CH$_2$OH, (CH$_2$)$_n$SH, CH$_2$NHCH$_2$CH$_2$SH, (CH$_2$)$_n$NHC(=S)NH$_2$, (CH$_2$)$_n$NH$_2$, (CH$_2$)$_n$N(Me)$_2$, (CH$_2$)$_n$N(Et)$_2$, (CH$_2$)$_n$(iPr)$_2$, CH(CH$_3$)NH$_2$, C(CH$_3$)$_2$NH$_2$, CH$_2$NHCH$_2$CH$_2$NH$_2$, CH$_2$NHCH$_2$CH$_2$NHCH$_2$CH$_2$NH$_2$, CH$_2$N(CH$_2$CH$_2$NH$_2$)$_2$, CH$_2$NHCH$_2$CH$_2$N(CH$_2$CH$_2$NH$_2$)$_2$, CH$_2$N(CH$_2$CH$_2$OH)$_2$, (CH$_2$)$_n$(morpholin-4-yl), (CH$_2$)$_n$(piperidin-1-yl), (CH$_2$)$_n$(4-methylpiperazin-1-yl), N(SO$_2$CF3)$_2$, (CH$_2$)$_n$CHO, (CH$_2$)$_n$Si(Me)$_2$H, (CH$_2$)$_n$Si(Et)$_2$H, (CH$_2$)Si(iPr)$_2$H, (CH$_2$)$_n$Si(tBu)$_2$H, (CH$_2$)$_n$Si(Ph)$_2$H, (CH$_2$)$_n$Si(Ph)(tBu)H, (CH$_2$)$_n$Si(Me)$_2$Cl, (CH$_2$)$_n$Si(Et)$_2$Cl, (CH$_2$)$_n$Si(i-Pr)$_2$Cl, (CH$_2$)$_n$Si(tBu)$_2$Cl, (CH$_2$)$_n$Si(Ph)$_2$Cl, (CH$_2$)$_n$Si(tBu)(Ph)Cl, P(Ph)$_2$, P(o-tolyl)$_2$,

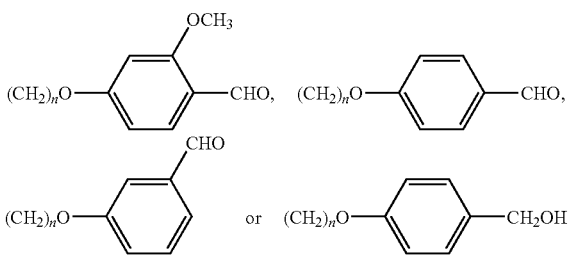

wherein n is zero or an integer from 1 to 5;
Y is H, Cl, Br, F, OH, or OMe;
Z is NCO, CO$_2$Me, CO$_2$Et, CO$_2$(i-Pr), CO$_2$(n-Bu), CO$_2$(t-Bu), CN, CO$_2$H, COCl, CO$_2$CH(CF$_3$)$_2$, CO$_2$(pentafluorophenyl), CO$_2$(pentachlorophenyl), CO$_2$Ph, CO$_2$(N-succinimidyl), C(OMe)$_3$, C(OEt)$_2$, CON(OCH$_3$)CH$_3$, CHO, CH$_2$OH, or C(CH$_3$)$_2$OH; and
R$^4$ is

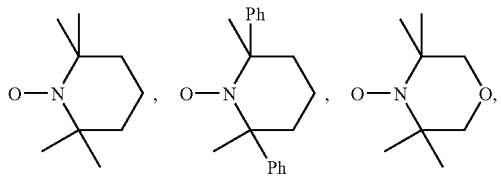

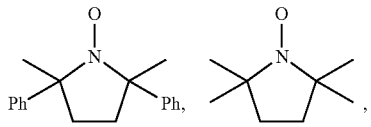

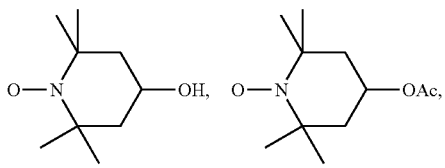

-continued

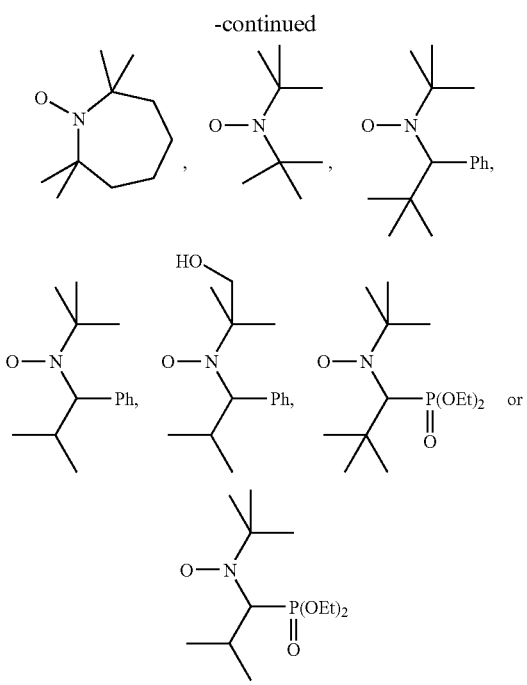

which comprises the step of microwave irradiating a mixture comprising a compound of the formula II

a compound III selected from:

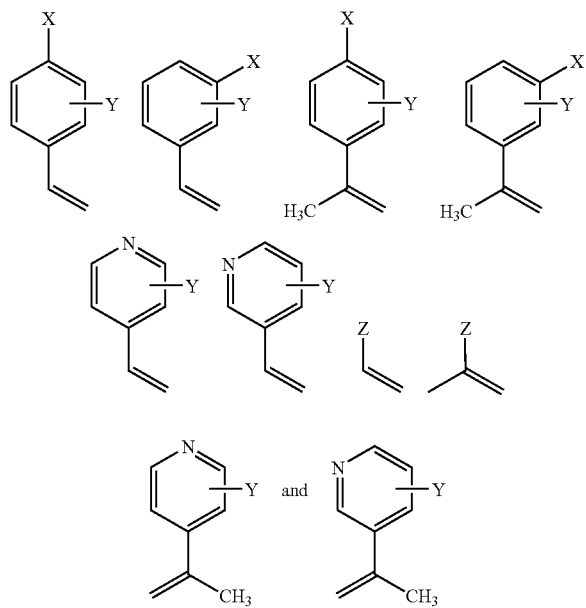

and a compound V selected from:

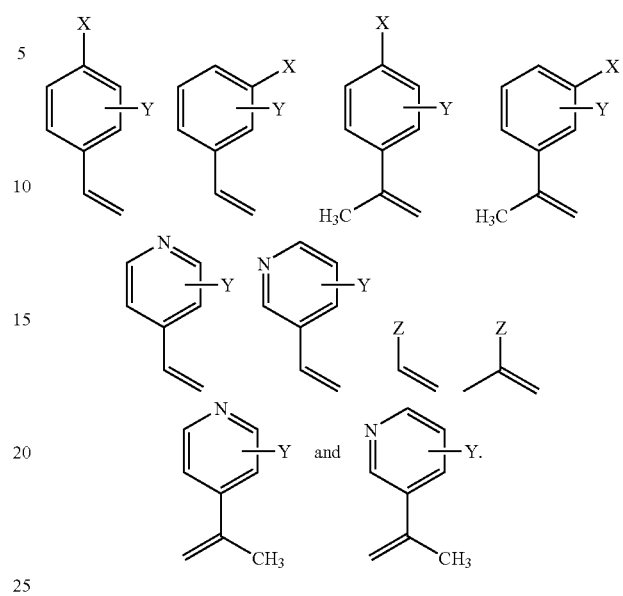

In further embodiment, the invention is directed to a process for the preparation of a compound of the Formula VI:

$$\bullet\!-\![L\!-\!(R^1\!-\!R^2)_m\!-\!R^4]_b \qquad VI$$

wherein

● is an insoluble solid support selected from the group consisting of: poly(styrene-divinylbenzene), macroreticular poly(styrene-divinylbenzene), polystyrene which is radiation grafted to polypropylene, polystyrene which is radiation grafted to polyethylene, polystyrene which is radiation grafted to poly(tetrafluoroethylene), and polystyrene which is radiation grafted to poly(ethylene-tetrafluoroethylene) wherein the insoluble solid support is in a shape selected from a bead, a tube, a rod, a ring, a disk, or a well; L is —CH$_2$—, —C(CH$_3$)$_2$—, —CH(CH$_3$)—, —(CH$_2$)$_n$CH(CN)—, —(CH$_2$)$_n$CH(CO$_2$Me)-, —(CH$_2$)$_n$CH(Ph)-, —(CH$_2$)$_n$C(CH$_3$, Ph)-, —CH(CH$_2$CH$_2$Ph)-, or

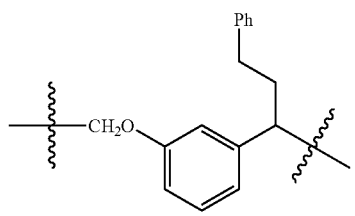

n is zero or an integer from 1 to 5;
m is zero or an integer from 1 to 100;

w is an integer from 1 to 10;

p is zero or an integer from 1 to 10;

b is mMol content of initiator or solid-supported polymer per gram of insoluble solid support and is about 0.1 to about 5.0 mMol per gram;

$R^1$ is selected from

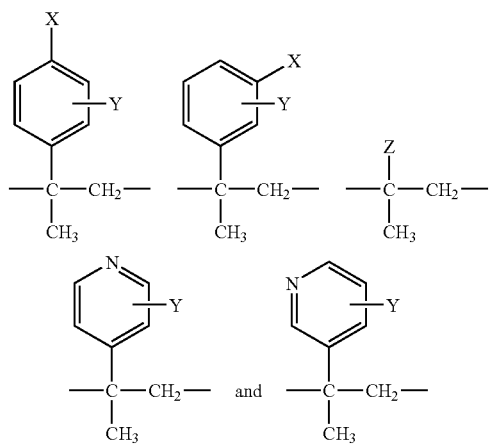

$R^2$ is selected from

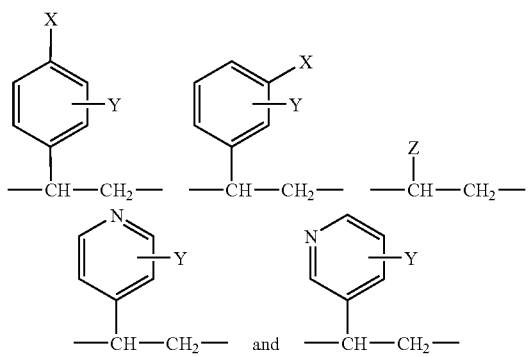

wherein

X is H, F, $(CH_2)_nCl$, $(CH_2)_nBr$, $(CH_2)_nI$, $B(OH)_2$, $(CH_2)_nCH=CH_2$, NCO, $CH_2NCO$, $CH(CH_3)NCO$, $C(CH_3)_2NCO$, $CO_2Me$, $CO_2Et$, $CO_2(t\text{-}Bu)$, $CO_2H$, COCl, $CO_2CH(CF_3)_2$, $CO_2Ph$, $CO_2$(pentafluorophenyl), $CO_2$(pentachlorophenyl), $CO_2$(N-succinimidyl), $C(OMe)_3$, $C(OEt)_3$, $(CH_2)_nOH$, $(CH_2)_nCH(OH)CH_2OH$, $(CH_2)_nSH$, $CH_2NHCH_2CH_2SH$, $(CH_2)_nNHC(=S)NH_2$, $(CH_2)_nNH_2$, $(CH_2)_nN(Me)_2$, $(CH_2)_nN(Et)_2$, $(CH_2)_n(iPr)_2$, $CH(CH_3)NH_2$, $C(CH_3)_2NH_2$, $CH_2NHCH_2CH_2NH_2$, $CH_2NHCH_2CH_2NHCH_2CH_2NH_2$, $CH_2N(CH_2CH_2NH_2)_2$, $CH_2NHCH_2CH_2N(CH_2CH_2NH_2)_2$, $CH_2N(CH_2CH_2OH)_2$, $(CH_2)_n$(morpholin-4-yl), $(CH_2)_n$(piperidin-1-yl), $(CH_2)_n$(4-methypiperazin-1-yl), $N(SO_2CF3)_2$, $(CH_2)_nCHO$, $(CH_2)_nSi(Me)_2H$, $(CH_2)_nSi(Et)_2H$, $(CH_2)Si(iPr)_2H$, $(CH_2)_nSi(tBu)_2H$, $(CH_2)_nSi(Ph)_2H$, $(CH_2)_nSi(Ph)(tBu)H$, $(CH_2)_nSi(Me)_2Cl$, $(CH_2)_nSi(Et)_2Cl$, $(CH_2)_nSi(i\text{-}Pr)_2Cl$, $(CH_2)_nSi(tBu)_2Cl$, $(CH_2)_nSi(Ph)_2Cl$, $(CH_2)_nSi(tBu)(Ph)Cl$, $P(Ph)_2$, P(o-tolyl)

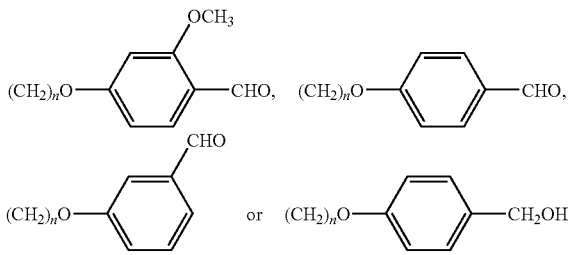

wherein n is zero or an integer from 1 to 5;

Y is H, Cl, Br, F, OH, or OMe;

Z is NCO, $CO_2Me$, $CO_2Et$, $CO_2(i\text{-}Pr)$, $CO_2(n\text{-}Bu)$, $CO_2(t\text{-}Bu)$, CN, $CO_2H$, COCl, $CO_2CH(CF_3)_2$, $CO_2$(pentafluorophenyl), $CO_2$(pentachlorophenyl), $CO_2Ph$, $CO_2$(N-succinimidyl), $C(OMe)_3$, $C(OEt)_2$, $CON(OCH_3)CH_3$, CHO, $CH_2OH$, or $C(CH_3)_2OH$; and $R^4$ is

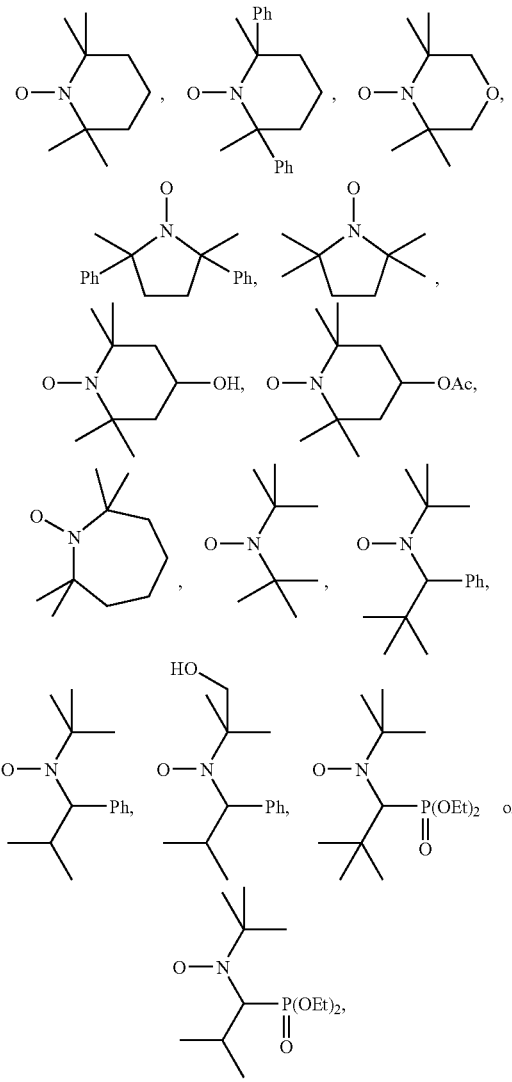

which comprises the step of microwave irradiating a mixture comprising a compound of the formula II

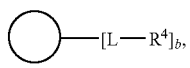

a compound VII selected from:

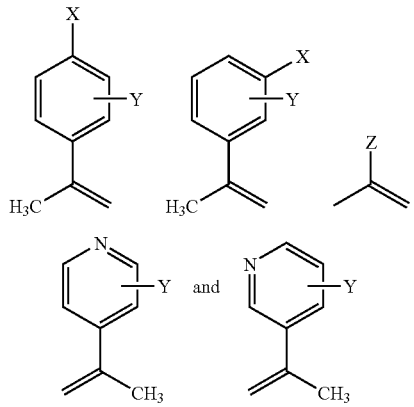

and a compound VIII selected from:

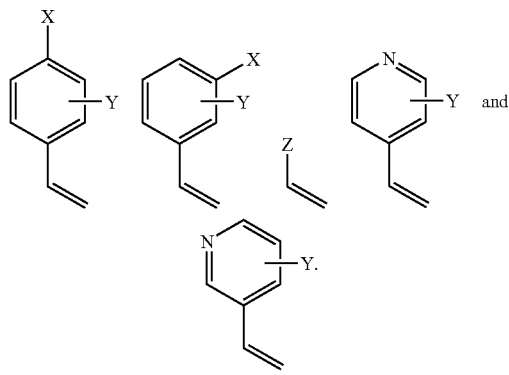

wherein the ratio of the compound VII and the compound VIII is about 2:1.

It has been unexpectedly found that the expedient preparation of the functionalized resins of the instant invention by the heating of compound I with the monomeric units compounds III, VII and/or VIII results in resins with optimal growth, loading and spherical particle size.

In an embodiment of the instant invention the microwave temperature at which compound I is heated with the the monomeric units compounds III and/or V is a temperature between about 160° C. and about 220° C. In a further embodiment of the instant invention, the microwave temperature is between about 180° C. and about 200° C.

In another embodiment of the instant invention is a compound which is is a polystyrene resin, m is from 1 to 100 and the bromine content is from about 4 to about 6 mmol/gram of resin.

In another embodiment of the instant invention is a compound which is wherein is a polystyrene resin, m is from 1 to 100 and the chlorine content is from about 5 to about 7 mmol/gram of resin. The term "(m,p)" as used in the structures above and below represents the meta or para position of the substituent on the phenyl moiety.

In another embodiment of the instant invention is a compound which is wherein

is a polystyrene resin, M is from 1 to 100 and the pyridyl content is from about 5 to about 7 mmol/gram of resin.

In another embodiment of the instant invention is a compound which is

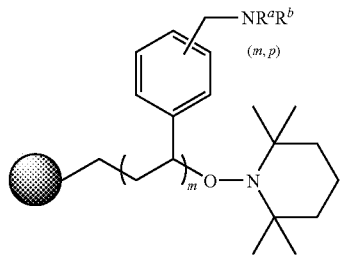

wherein

is a polystyrene resin, m is from 1 to 100, —NR$^a$R$^b$ is selected from diethylamino, diisopropylamino, piperidinyl, morpholino and piperazinyl and the amine content is from about 4 to about 7 mmol/gram of resin.

In another embodiment of the instant invention is a compound which is

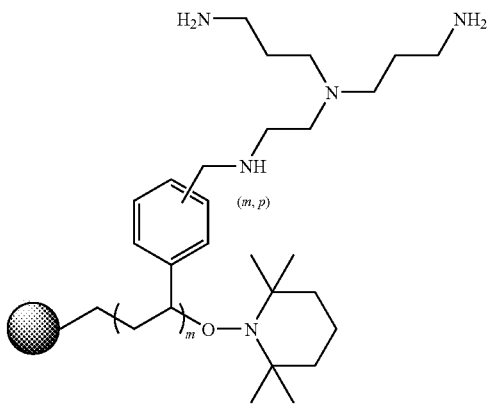

wherein · is a polystyrene resin, m is from 1 to 100, and the amine content is from about 3 to about 6 mmol/gram of resin.

In another embodiment of the instant invention is a compound which is

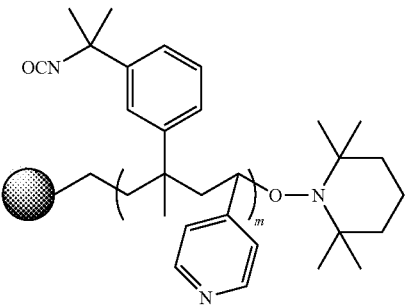

wherein

is a polystyrene resin, m is from 1 to 100, and the isocyanate content is from about 1 to about 4 mmol/gram of resin.

The term "growth" as used herein refers to the ratio of the mass of the product resin bead to the mass of the initiator bead. This ratio may be referred to as a P/I ratio. In an embodiment of the instant invention the P/I ratio is greater than 4.

The term "loading" as used herein refers to the molar equivalents of functional groups in the product resin bead per gram of resin bead. In an embodiment of the invention the loading of the product beads is greater than 4.0 mmol/g.

The term "spherical particle size" as used herein refers to the size of the dry product resin bead before it undergoes solvent swelling.

The following Table 1 provides a list of definitions and abbreviations used in the present invention.

TABLE 1

| Definitions and Abbreviations | |
|---|---|
| Term | Definition |
| Byproduct | An undesirable product of a reaction which comprises at least two mole percent of the crude product. Isomers, enantiomers and diastereomers of the desired product are not considered to be byproducts within the scope of this invention. |
| Crude reaction product | The result of a chemical reaction before any purification. This term is synonymous with crude product and crude reaction mixture. |
| Enhancing purity | A) For a single desired compound: The process of removing excess or unreacted starting reagents to the limit of detection by TLC or by NMR spectroscopy and/or reducing the content of anysingle byproduct to less than two mole percent, exclusive of solvents. B) For a combinatorial mixture of desiredcompounds: The process of removing excess or unreacted starting reagents and or reducing the content of a byproduct using a procedure that has been validated on crude reaction products of analogous single compounds. |
| Solid support | A material which does not dissolve in organic and/or aqueous solvents and mixtures thereof. |
| Insoluble polymer | A polymeric compound which by virtue of its structure and high molecular weight is incapable of dissolving in organic and/or aqueous solvents and mixtures thereof. |

TABLE 1-continued

Definitions and Abbreviations

| Term | Definition |
|---|---|
| Solid-supported scavenger | A molecule which is attached to an insoluble solid and binds to a starting reagent and/or to a byproduct in a covalent and/or ionic manner, thereby removing it from a solution. A synonym for a polymer-supported quench reagent. |
| Resin | A synonym for an insoluble polymer, usually in beaded form. |
| Resin swelling solvent | A solvent which penetrates pores of an insoluble polymer and causes it to increase in volume. |
| Soluble polymer | A polymeric compound which by virtue of its structure and molecular weight is able to dissolve in selected solvents. |
| Radiation grafting | The process for preparing a complex polymeric compound which entails treating a mixture of base polymer such as, for example, polyethylene, polypropylene, poly(ethylene-tetrafluoroethylene) or poly(tetrafluoroethylene), and a monomer such as, for example, styrene with ionizing radiation. This process results in the polymerization of polystyrene onto the base polymer. |
| Grafted copolymer | A complex polymer that is produced by radiation grafting. A synonym for a radiation grafted copolymer. |
| Solid-supported polymer | A polymeric compound which is covalently attached to an insoluble solid. |
| Functional polymer | A polymer which bears multiple instances of chemically reactive functional groups. |
| Macroreticular | A property of insoluble polymers indicating a rigid, highly crosslinked polymer which does not swell in any solvent and is porous. |
| Polydispersity | A polymer property indicating variable length and molecular weight. |
| Monodispersity | A polymer property indicating highly uniform length and molecular weight |
| mw | microwave |
| JR | Infrared spectroscopy |
| MS | Mass spectrometry |
| $^1$H-NMR | Proton nuclear magnetic resonance spectroscopy |
| Ph | Phenyl |
| Me | Methyl or —$CH_3$ |
| Et | Ethyl or —$CH_2CH_3$ |
| iPr | Isopropyl or —$CH(CH_3)_2$ |
| Bu | Butyl or —$CH_2CH_2CH_2CH_3$ |
| t-BU | Tertiary-Butyl or $C(CH_3)_3$ |
| NCO | Isocyanate |
| BA | Butyl acrylate |
| BMA | Butyl methacrylate |
| ST | Styrene or vinylbenzene |
| MeST | α-Methylstyrene or 2-phenylpropene |
| DVB | 1,2-Divinylbenzene |
| Br-ST | 4-Bromostyrene |
| 3-Br-ST | 3-Bromostyrene |
| HO-ST | 4-Hydroxy styrene |
| 3-HO-ST | 3-Hydroxy styrene |
| $HOCH_2$-ST | Hydroxymethyl-styrene (typically obtained as a mixture of 3- and 4-vinyl-benzyl alcohol) |
| $ClCH_2$-ST | Chloromethyl-styrene (typically obtained as a mixture of 3-and 4-vinyl-benzyl chloride) |
| H-DIPS-ST | (4-vinyl)phenyl-diisopropyl-silane |
| Cl-DIPS-ST | (4-vinyl)phenyl-diisopropyl-chlorosilane |
| Fs-ST | 2,3,4,5,6-pentafluorostyrene |
| TMI | 3-(2-Propenyl)-a,a-dimethylbenzyl isocyanate |
| DCM | Dichloromethane |
| MeOH | Methanol |
| DMF | N,N-Dimethylformamide |
| THF | Tetrahydrofuran |
| EtOAc | Ethyl acetate |
| EtOH | Ethanol |
| MeCN | Acetonitrile |
| TEMPO | 2,2,6,6-Tetramethylpiperidinyloxy free radical |
| TEMPO-H | 1-Hydroxy-2,2,6,6-tetramethylpiperidine |
| PhNCO | Phenyl isocyanate |
| BUNCO | Butyl isocyanate |
| TFA | Trifluoroacetic acid |
| TFA-d | Deuterated trifluoroacetic acid |
| $OsO_4$ | Osmium tetroxide |
| NMO | N-Methylmorpholine-N-oxide |
| $Ph_3P$ | Triphenylphosphine |
| 9BBU | 9-Borabicyclo[3.3. l]nonane |
| DEAD | Diethyl azodicarboxylate |
| KBr | Potassium bromide |
| ● | An insoluble solid support selected from the group consisting of: poly(styrene-divinylbenzene), macroreticular poly(styrene-divinylbenzene), polystyrene which is radiation grafted to polypropylene, polystyrene which is radiation grafted to polyethylene, polystyrene which is radiation grafted to poly(tetrafluoroethylene), and polystyrene which is radiation grafted to poly(ethylene-tetrafluoroethylene) wherein the insoluble solid support is in a shape selected from a bead, a tube, a rod, a ring, a disk, or a well |

The compounds prepared by the process of the instant invention may also be represented by the following drawings: a cartoon structure 4 in which hair-like appendages represent new block polymer growth or alternatively by 5 wherein the shaded inner circle represents the original cross-linked polystyrene (PS) core and the outer clear circle represents new polymer growth. The moiety R in 5 represents functional substituents or sidechains on the monomeric units that make up the polymer growth.

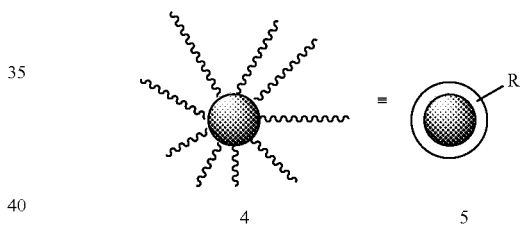

4　　　　　5

In an embodiment of the present invention, the compound of Formula I is one, wherein

○ is an insoluble solid support selected from the group consisting of: poly(styrene-divinylbenzene) and macroreticular poly(styrene-divinylbenzene) in the shape of a bead.

In another embodiment of the present invention, the compound of Formula I is one wherein

● is an insoluble solid support selected from the group consisting of: polystyrene which is radiation grafted to polypropylene, polystyrene which is radiation grafted to polyethylene, polystyrene which is radiation grafted to poly(tetrafluoroethylene) and polystyrene which is radiation grafted to poly (ethylene-tetrafluoroethylene) in the shape selected from a tube, a rod, a ring, a disk, or a well.

In a further embodiment of the present invention, the compound of Formula I is one wherein L is —CH$_2$—, —(CH$_2$)nC(CH$_3$, Ph)-, or —CH(CH$_2$CH$_2$Ph)-.

In an aspect of the present invention, the compound of Formula I is one wherein m is an integer from 1 to 300.

In another aspect of the present invention, the compound of Formula IV is one wherein m is an integer from 1 to 300.

In another aspect of the present invention, the compound of Formula VI is one wherein m is an integer from 1 to 300.

In an embodiment of the present invention, the compound of Formula I is one wherein X is NCO, CH$_2$NCO, CH(CH$_3$)NCO or C(CH$_3$)$_2$NCO, and Y is H.

In an embodiment of the present invention, the compound of Formula I is one wherein X is (CH$_2$)$_n$NH$_2$, (CH$_2$)$_n$N(Me)$_2$, (CH$_2$N(Et)$_2$, (CH$_2$)$_n$(iPr)$_2$, CH(CH$_3$)NH$_2$, C(CH$_3$)$_2$NH$_2$, CH$_2$NHCH$_2$CH$_2$NH$_2$, CH$_2$NHCH$_2$CH$_2$NHCH$_2$CH$_2$NH$_2$, CH$_2$N(CH$_2$CH$_2$NH$_2$)$_2$, CH$_2$NHCH$_2$CH$_2$N(CH$_2$CH$_2$NH$_2$)$_2$, CH$_2$N(CH$_2$CH$_2$OH)$_2$, (CH$_2$)$_n$(morpholin-4-yl), (CH$_2$)$_n$(piperidin-1-yl), or (CH$_2$)$_n$(4-methypiperain-1-yl) wherein n is zero or an integer from 1 to 5.

In an embodiment of the present invention, the compound of Formula I is one wherein X is (CH$_2$)$_n$SH, CH$_2$NHCH$_2$CH$_2$SH, or CH$_2$NHC(=S)NH$_2$ wherein n is zero or an integer from 1 to 5.

In an embodiment of the present invention, the compound of Formula I is one wherein X is (CH$_2$)$_n$Cl, (CH$_2$)$_n$Br, (CH$_2$)$_n$I, (CH$_2$)$_n$OH, or (CH$_2$)$_n$CH(OH)CH$_2$OH wherein n is zero or an integer from 1 to 5.

In an embodiment of the present invention, the compound of Formula I is one wherein X is CO$_2$Me, CO$_2$Et, CO$_2$(t-Bu), CO$_2$H, COCl, CO$_2$CH(CF$_3$)$_2$, CO$_2$Phy CO$_2$(pentafluorophenyl), CO$_2$(pentachlorophenyl), CO$_2$(N-succinimidyl), C(OMe)$_3$, or C(OEt)$_3$. In another embodiment of the present invention, the compound of Formula I is one wherein Z is NCO, CO$_2$Me, CO$_2$Et, CO$_2$(i-Pr), CO$_2$(n-Bu), CO$_2$(t-Bu), CN, CO$_2$H, COCl, CO$_2$CH(CF3)$_2$, CO$_2$(pentafluorophenyl), CO$_2$(pentachlorophenyl), CO$_2$Ph, CO~(N-succinimidyl), C(OMe)$_3$, C(OEt)$_3$, CON(OCH$_3$)CH$_3$, CHO, CH$_2$OH or C(CH$_3$)$_2$OH.

In an embodiment of the present invention, the compound of Formula I is one wherein wherein X is (CH$_2$)$_n$Si(Me)$_2$H, (CH$_2$)$_n$Si(Et)$_2$H, (CH$_2$)$_n$Si(iPr)$_2$H, (CH$_2$)$_n$Si(Me)$_2$Cl, (CH$_2$)$_n$Si(Et)$_2$Cl or (CH$_2$)$_n$Si(iPr)$_2$Cl. In another embodiment of the present invention, the compound of Formula I is one wherein R$^4$ is CH$_2$ and R$^5$ is CH$_3$.

In an embodiment of the instant invention, R4 is

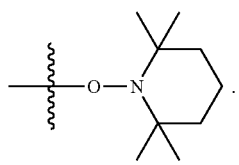

The methods of syntheses of the instant invention can be carried out in a microwave synthesizer such as those devices manufactured by Personal Chemistry™, CEM™ and Milestone™. In an embodiment, the instant syntheses are performed in a Personal Chemistry™ Smithsynthesizer™.

Compounds of Formula I, IV and VI wherein

L, R$^1$, R$^2$, R$^3$, R$^4$, R$^5$, m, w, p and b are as defined above can be prepared by the general procedures, as set forth in Reaction Schemes I-X. These schemes provide typical procedures for preparing compounds of Formulae I, IV and VI.

REACTION SCHEME I

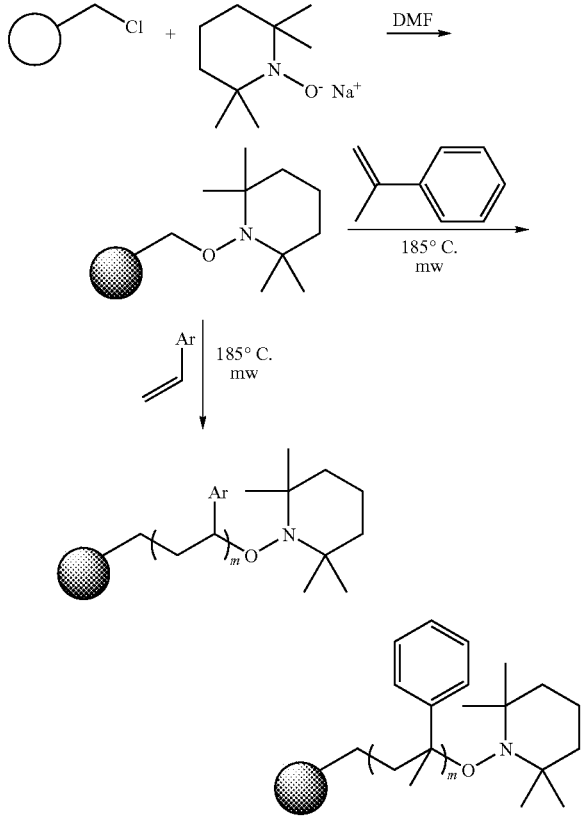

REACTION SCHEME II

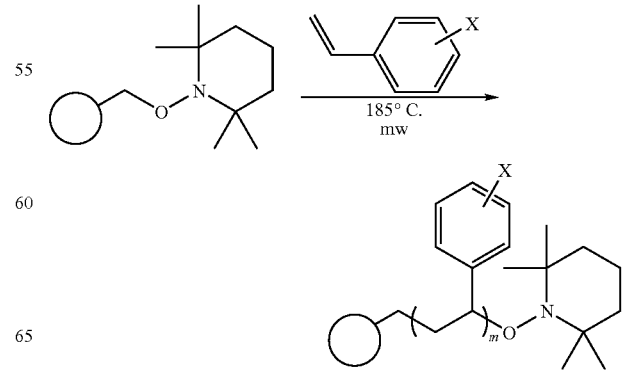

-continued
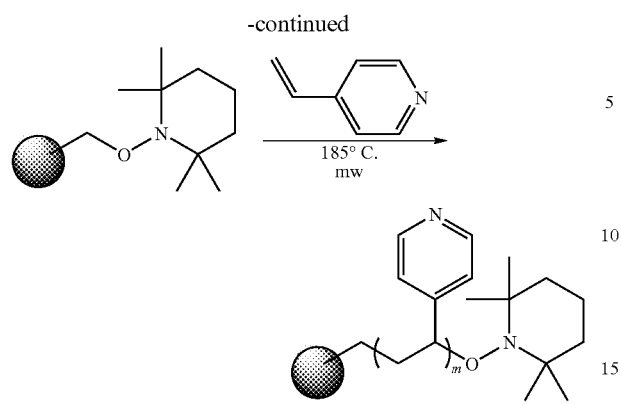
REACTION SCHEME III
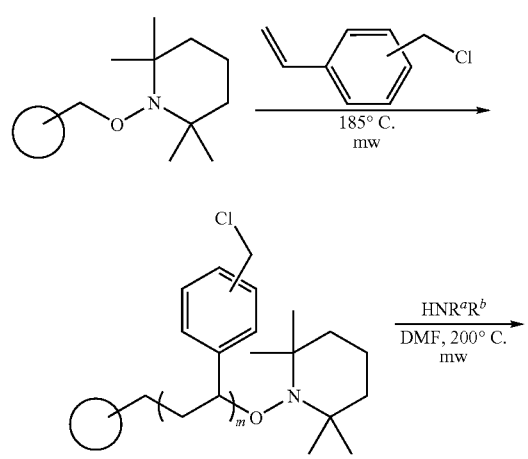
REACTION SCHEME IV
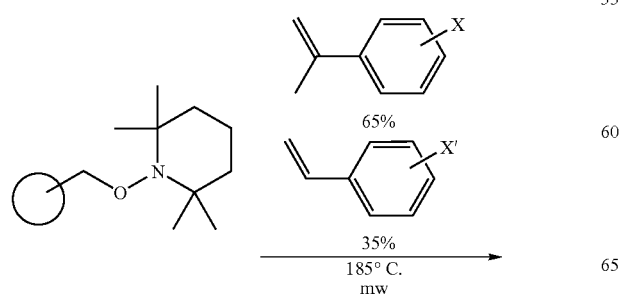
-continued
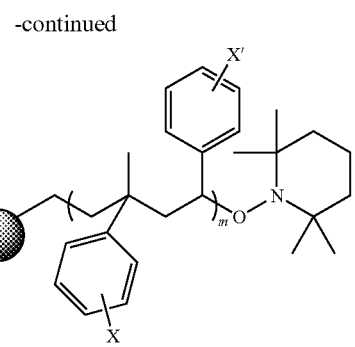
REACTION SCHEME V
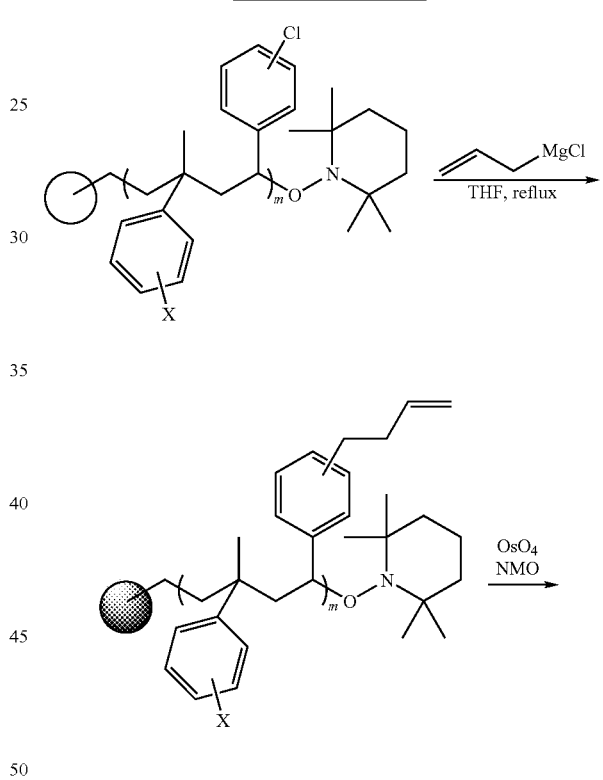
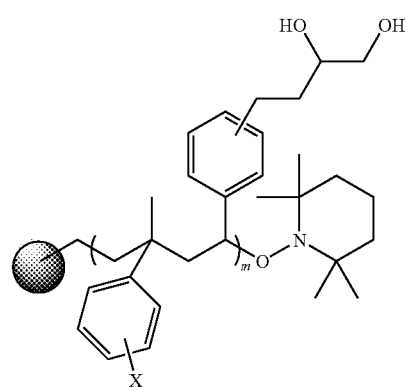

REACTION SCHEME VI
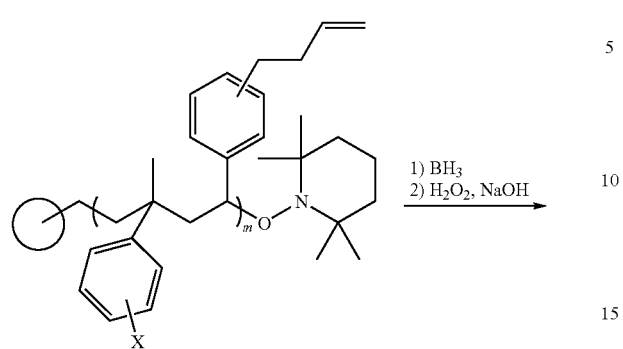
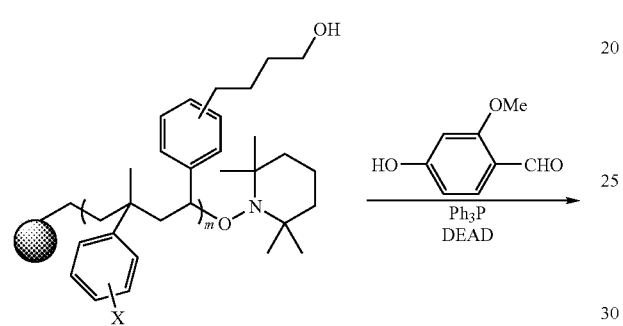
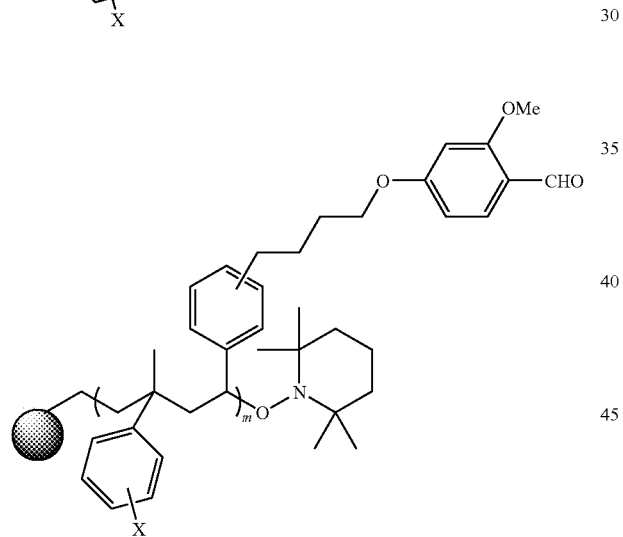
REACTION SCHEME VII
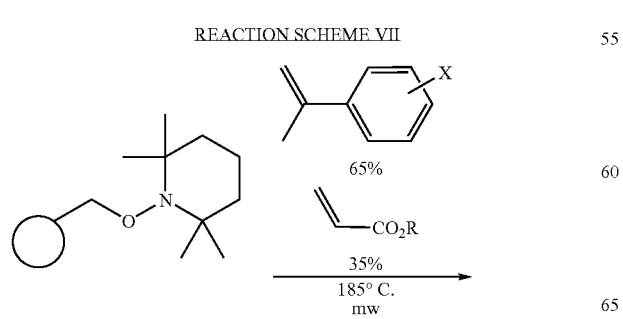
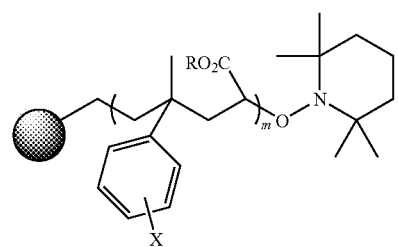
REACTION SCHEME VIII
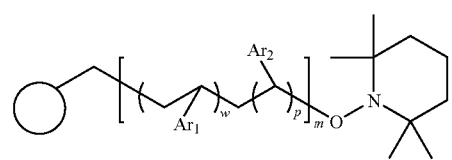
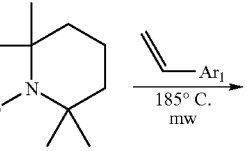
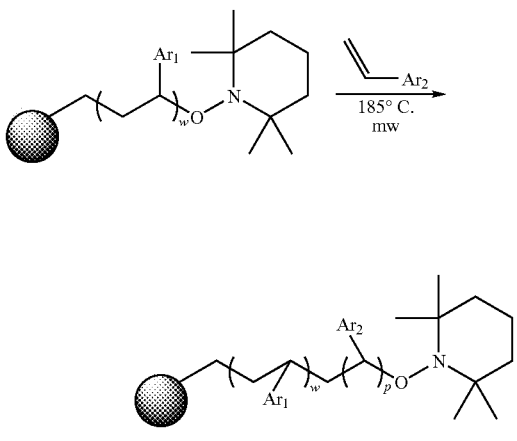

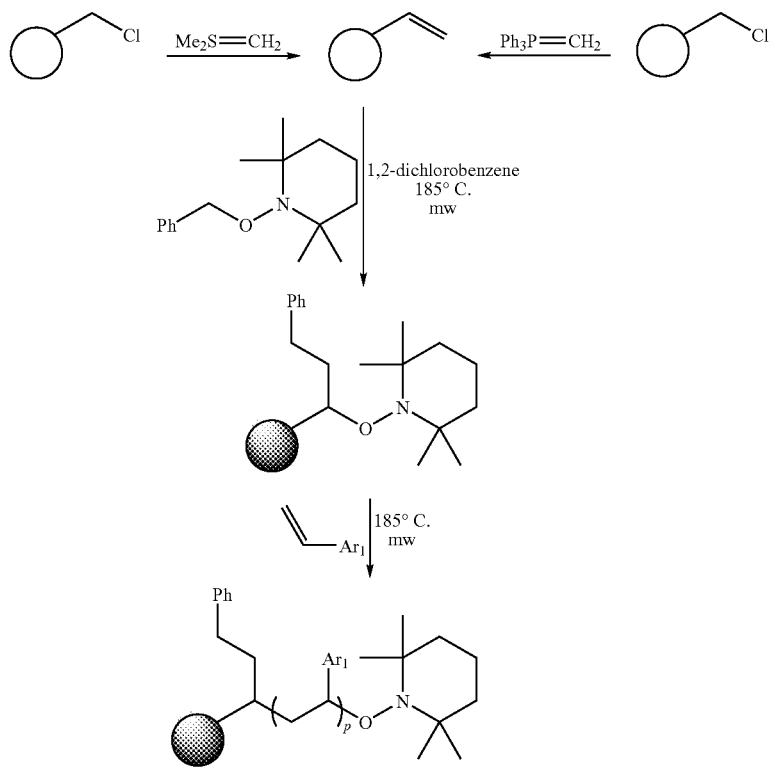

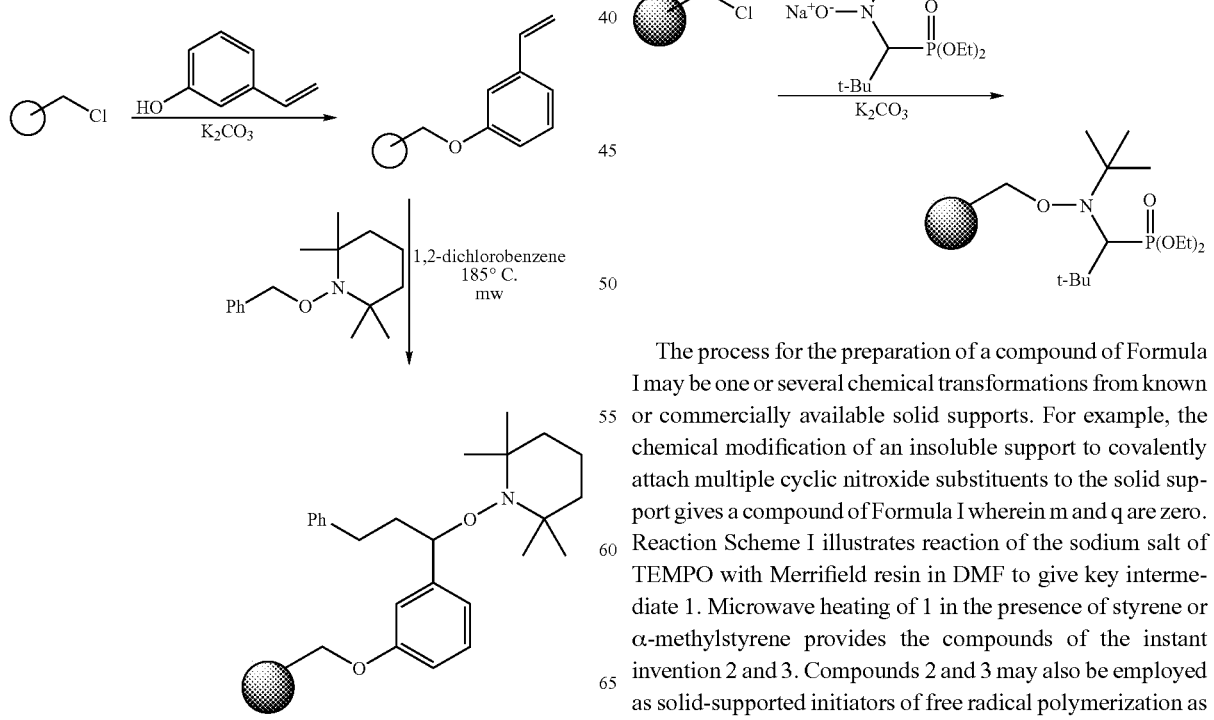

The process for the preparation of a compound of Formula I may be one or several chemical transformations from known or commercially available solid supports. For example, the chemical modification of an insoluble support to covalently attach multiple cyclic nitroxide substituents to the solid support gives a compound of Formula I wherein m and q are zero. Reaction Scheme I illustrates reaction of the sodium salt of TEMPO with Merrifield resin in DMF to give key intermediate 1. Microwave heating of 1 in the presence of styrene or α-methylstyrene provides the compounds of the instant invention 2 and 3. Compounds 2 and 3 may also be employed as solid-supported initiators of free radical polymerization as shown in the Reaction Scheme.

Reaction Scheme II illustrates reaction of intermediate 1 with a suitably substituted styrene and vinyl pyridine, allowing incorporation of a functional group into the polymer resin product.

As illustrated in Reaction Scheme III, reaction of intermediate 1 with o,p-chloromethylstyrene provides compound 4, which may undergo reaction with a variety of amines to provide a proton scavenging resin 5. This synthetic route may be generally described as comprising: (1) chemical modification of an insoluble support to covalently attach multiple cyclic nitroxide substituents to the solid support, (2) heating the nitroxide-modified solid support with one or more substituted styrene monomers to grow polymeric chains onto the solid support, (3) rinsing of the solid-supported polymer to remove excess monomer(s) and unattached polymer(s), and (4) chemical transformation of functional groups on the polymer as necessary to create a compound of Formula 1.

Reacting intermediate 1 with a 2:1 ratio mixture of suitably substituted α-methylstyrene and styrenes provides a product in which the two monomeric units are incorporated in an alternating order and in equal amounts, as shown in Reaction Scheme IV.

Reaction Scheme V illustrates additional functionalization of a chloromethyl substituent on a styrene monomer. In particular, the high loading polymer resin 6 may be used as a bromine scavenger and the diol polymer resin 7 may be used to scavenge aldehydes, ketones and silyl chlorides. Reaction Scheme VI illustrates further functional transformations to provide polymer resins that could support carboxylic acids or amines in solid phase syntheses.

As illustrated in Reaction Scheme VII, other monomeric units such as acrylates may be used in the reaction with intermediate 1.

As illustrated in Reaction Scheme VIII, reacting intermediate 1 with equal amounts of two similar monomers will provide polymeric chains wherein the monomers are incorporated in a random fashion. Reaction Scheme VIII also illustrates that intermediate 1 may be reacted with one monomer, the excess monomer and unreacted polymer removed with rinsing, and the resulting solid supported polymer having a cyclic nitroxide end group reacted with another monomer to provide the solid supported polymer 8. In general, such a sequence of reactions may be described as comprising the steps of: (1) chemical modification of an insoluble support to covalently attach multiple cyclic nitroxide substituents to the solid support, (2) heating the nitroxide-modified solid support with a substituted styrene or acrylate monomer to grow polymeric chains onto the solid support, (3) rinsing of the solid-supported polymer to remove excess monomer and unattached polymer, (4) heating the resulting solid-supported polymer which still contains cyclic nitroxide moieties with one or more substituted styrene and/or acrylate monomers to extend the polymeric chains, (5) rinsing of the solid-supported polymer to remove excess monomers and unattached polymers, and (6) chemical transformation of functional groups on the polymer as necessary to create a compound of Formula 1 wherein m is an integer from 1 to 100 and q is an integer from 1 to 300. The effect of this multi-step block polymerization is to extend the desired chemical functionality away from the solid support where it can freely react with reagents in the solution phase.

Reaction Scheme IX shows that derivatives of intermediate 1 may also be prepared and utilized as the nitroxide-modified solid support for preparation of polymeric chains. Reaction Scheme X shows preparation of additional nitroxide-modified solid supports.

In the practice of the processes of the present invention, it is often advantageous to remove polymerization inhibitors which are added as preservative to commercial monomers before using these monomers in the methods described above. This may be done through standard means which are known to those skilled in the art of organic synthesis such as, for example, fractional distillation, liquid-liquid extraction, solid-liquid extraction or polymer-supported scavenging and the like. Additionally, the inhibitor may be destroyed in situ by addition of at least one molar equivalent of an isocyanate such as, for example, BUNCO, PhNCO and the like per equivalent of inhibitor. The isocyanate reacts with the inhibitor. The resulting inhibitor-isocyanate adducts have no effect on the polymerization process and are easily rinsed away from the desired solid-supported polymers.

Preparation of solid-supported polymer chains having alternating monomeric subunits is typically enhanced when the optionally functionalized α-methylstyrene monomer composes at least 60 mole percent of the reaction mixture relative to the optionally functionalized styrene monomer. In cases where both monomers have functionality, this provides a means of alternating two different types of functionality in solid-supported polymers. In cases where only one of the monomers has functionality, this provides a means of modulating the content of functional groups in the solid-supported polymer. When an α-methylstyrene monomer is not one of the monomers, the two types of monomers do not necessarily alternate, i.e., a compound of Formula I wherein w and p are variable is produced.

EXAMPLES

Examples provided are intended to assist in a further understanding of the invention. Particular materials employed, species and conditions are intended to be illustrative of the invention and not limiting of the reasonable scope thereof.

Example 1

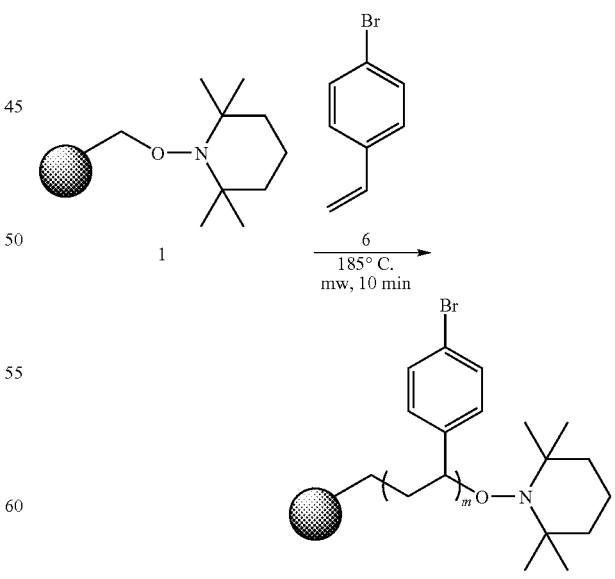

Compound 1 (200 mg, 1.86 mol/g, 192 μm, 0.37 mmol, prepared from PS-Cl (200 micron) resin from Argonaut Technologies in the manner described by J. C. Hodges et al. *J. Comb. Chem.* 2:80-88 (2000)) was suspended in p-bromostyrene 6 (3.3 mL, 16.8 mmol, 45 molar excess) in a 5 mL Smith Reaction vial. The mixture was heated with microwaves at 185° C. for 10 minutes leading to complete solidification of the monomer. Addition of $CH_2Cl_2$ to the polymeric mass dissolved any remaining 6 as well as any soluble polymer species. The mixture was then filtered through a sintered-glass frit and washed with five cycles of $CH_2Cl_2$ and $CH_3OH$ resulting in free flowing, spherical resin beads. After overnight drying in a vacuum oven at 50° C., the resin produced, 7, was visibly larger than the starting 1, displayed a 7.5-fold increase in mass and bromine analysis (44% Br) indicated a loading level of 5.5 mmol/g.

Example 2

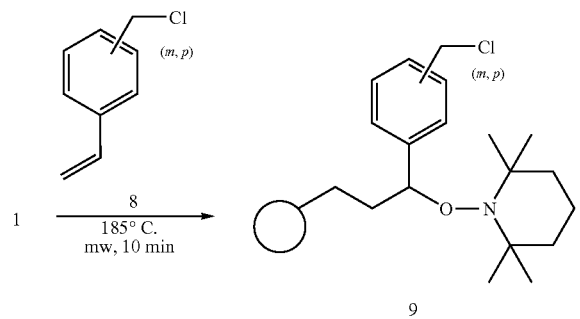

Compound 1 (200 mg, 1.86 mol/g, 192 μm, 0.37 mmol) was suspended in (m,p-mix)-chloromethylstyrene 8 (2.8 mL, 16.8 mmol, 45 molar excess) in a 5 mL reaction vessel and heated with microwaves at 185° C. for 10 minutes, resulting in to complete solidification of the monomer. The reaction mixture was then worked up as described in Example 1 to provide the Rasta Merrifield resin 9, with a 6.5-fold increase in mass and a loading level of 5.9 mmol/g (20.8% Cl).

Example 3

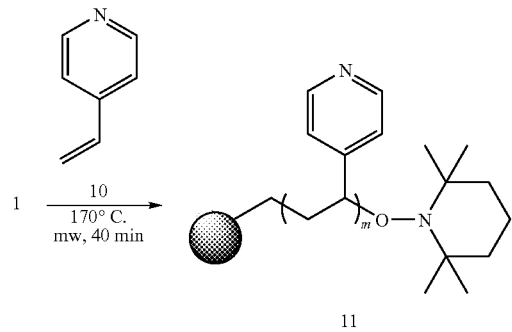

Compound 1 (200 mg, 1.86 mol/g, 192 μm, 0.37 mmol) was suspended in 4-vinylpyridine 10 (1.83 mL, 16.8 mmol, 45 molar excess) in a 5 mL reaction vessel and heated with microwaves at 170° C. for 40 minutes resulting in complete solidification of the monomer. Typical work-up, as described in Example 1, provided Rasta pyridine resin 11, with a 4.25-fold increase in mass and a loading level of >6 mmol/g. The dried resin swelled when suspended in methylene chloride, DMF, THF and methanol.

Example 4

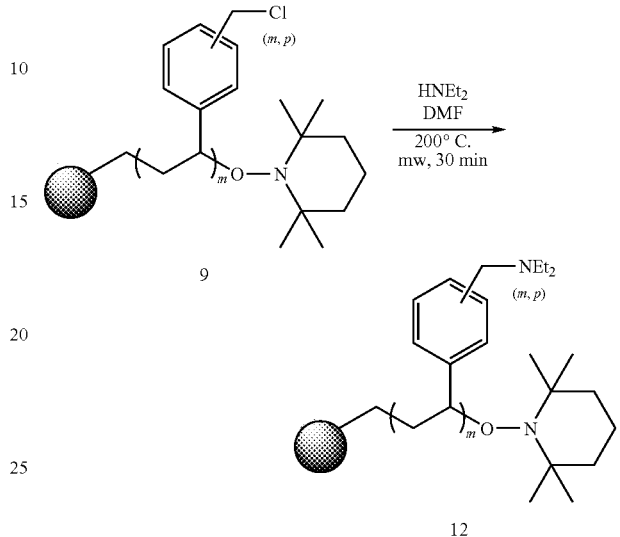

Compound 1 (100 mg, 0.185 mmol) was heated with diethyl amine (15 times molar excess) in DMF at 200° C. for 30 minutes. The workup (as described in Example 1) at the end of the reaction, resulted in compound 12, with a loading level of 5.9 mmol/g.

The substituted aminomethyl Rasta resins shown in the following table were prepared by simple modifications of the above procedure.

TABLE 2

| $HNR_1R_2$ | Analysis (%) | Loading |
|---|---|---|
| HN(iPr)₂ | C 81.05; H 9.03 N 6.24; Cl <0.27 | 4.5 mmol/g |
| HN-piperidine | C 83.00; H 9.62 N 7.03; Cl <0.22 | 5.0 mmol/g |

TABLE 2-continued

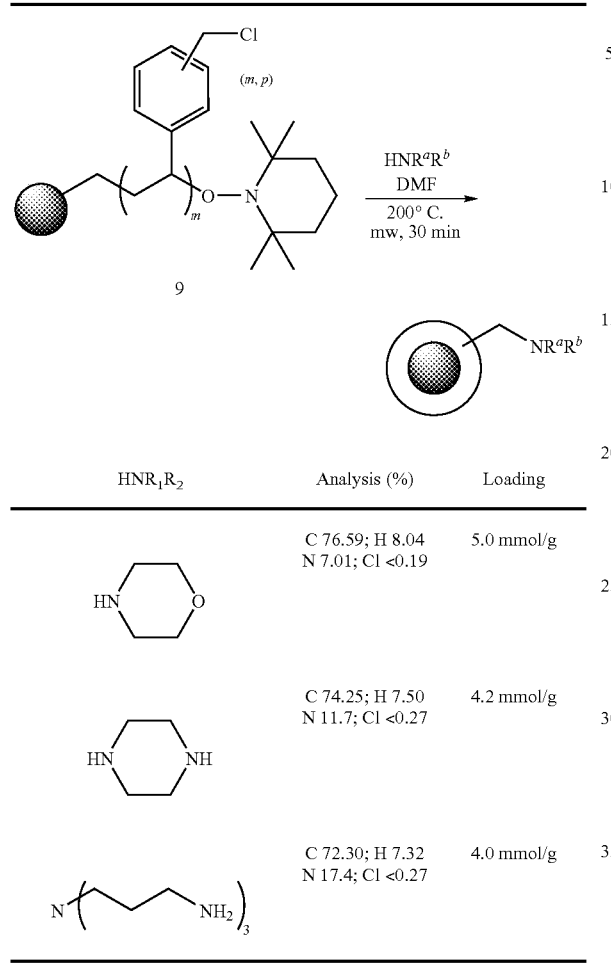

| $HNR_1R_2$ | Analysis (%) | Loading |
|---|---|---|
| (morpholine) | C 76.59; H 8.04<br>N 7.01; Cl <0.19 | 5.0 mmol/g |
| (piperazine) | C 74.25; H 7.50<br>N 11.7; Cl <0.27 | 4.2 mmol/g |
| (tris(3-aminopropyl)amine) | C 72.30; H 7.32<br>N 17.4; Cl <0.27 | 4.0 mmol/g |

100 mg of 9 employed for each entry in Table 2.

Example 5

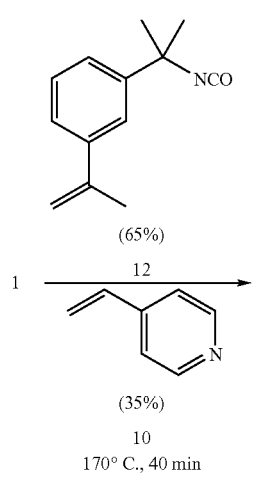

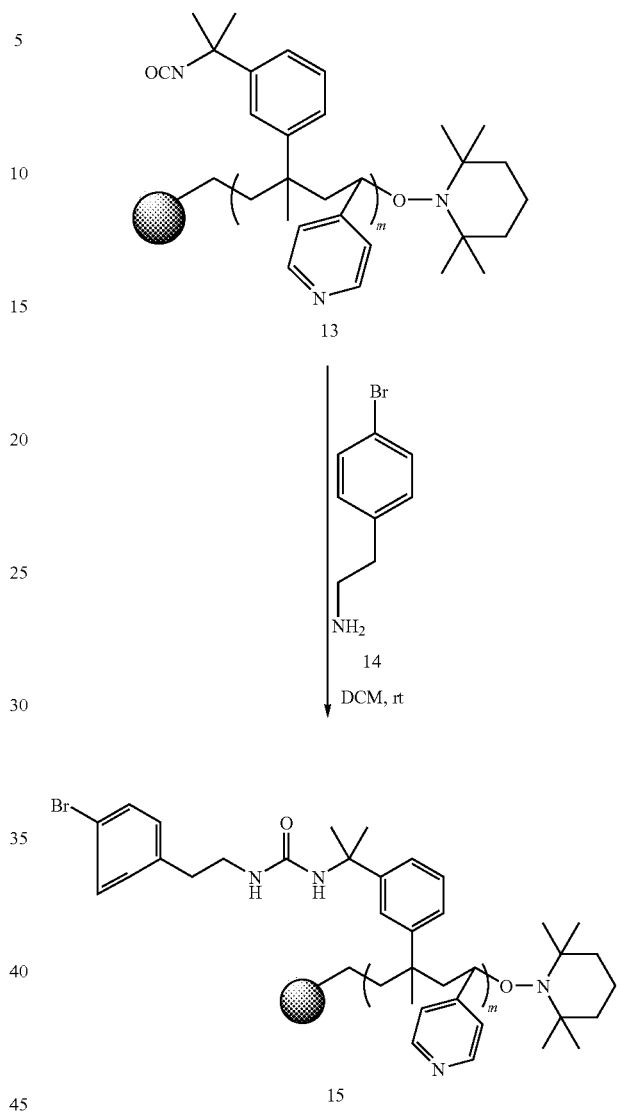

Step 1

Compound 1 (200 mg, 1.86 mmol/g, 0.37 mmol) was suspended in a 45 molar excess of styrenyl monomers consisting of 65% 3-isoproprenyl-α,α-dimethylbenzyl isocyanate (TMI), 12, (2.3 mL, 10.9 mmol) and 35% 10 (682 µL, 5.73 mol) in a 5 mL Smith Reaction vial for 40 minutes at 170° C. The new beads remained suspended in TMI polymer. Addition of alternating cycles of $CH_2Cl_2$ and hexanes, followed by drying in a vacuum oven afforded 450 mg (P/I ratio of 2.5) of 13 with a particle size of ~380 µm and a strong isocyanate stretch in the IR spectrum at 2250 $cm^{-1}$.

Step 2

The loading level of NCO/g in Compound 13 was determined by scavenging amine 14. After typical work-up and drying, elemental analysis of 15 indicated a loading level of 1.6 mmol/g (12.4% Br).

What is claimed is:

1. A process for the preparation of a compound of the formula I:

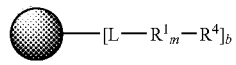

wherein

is an insoluble solid support selected from the group consisting of:

poly(styrene-divinylbenzene), macroreticular poly(styrene-divinylbenzene), polystyrene which is radiation grafted to polypropylene, polystyrene which is radiation grafted to polyethylene, polystyrene which is radiation grafted to poly(tetrafluoroethylene), and polystyrene which is radiation grafted to poly(ethylene-tetrafluoroethylene) wherein the insoluble solid support is in a shape selected from a bead, a tube, a rod, a ring, a disk, or a well; L is —CH$_2$—, —C(CH$_3$)$_2$—, —CH(CH$_3$)—, —(CH$_2$)$_n$CH(CN)—, —(CH$_2$)$_n$CH(CO$_2$Me)-, —(CH$_2$)$_n$CH(Ph)-, —(CH$_2$)$_n$C(CH$_3$, Ph)-, —CH(CH$_2$CH$_2$Ph)-, or

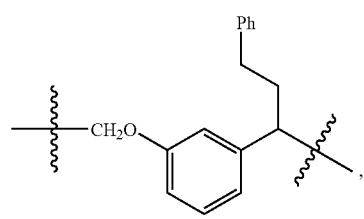

n is zero or an integer from 1 to 5;
m is zero or an integer from 1 to 100;
b is mMol content of initiator or solid-supported polymer per gram of insoluble solid support and is about 0.1 to about 5.0 in mMol per gram;
R$^1$ is selected from:

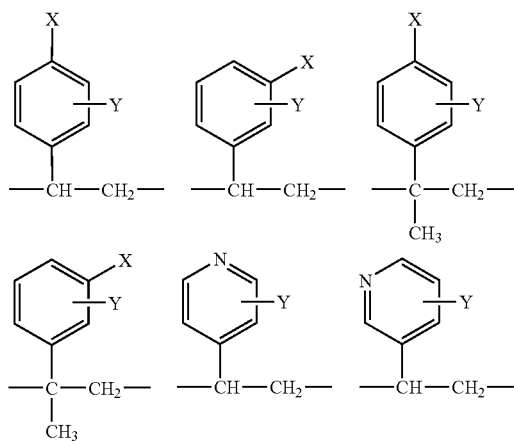

-continued

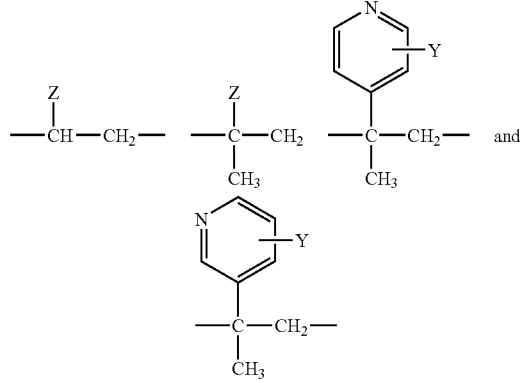

wherein

X is H, F, (CH$_2$)$_n$Cl, (CH$_2$)$_n$Br, (CH$_2$)$_n$I, B(OH)$_2$, (CH$_2$)$_n$CH=CH$_2$, NCO, CH$_2$NCO, CH(CH$_3$)NCO, C(CH$_3$)$_2$NCO, CO$_2$Me, CO$_2$Et, CO$_2$(t-Bu), CO$_2$H, COCl, CO$_2$CH(CF$_3$)$_2$, CO$_2$Ph, CO$_2$(pentafluorophenyl), CO$_2$(pentachlorophenyl), CO$_2$(N-succinimidyl), C(OMe)$_3$, C(OEt)$_3$, (CH$_2$)$_n$OH, (CH$_2$)$_n$CH(OH)CH$_2$OH, (CH$_2$)$_n$SH, CH$_2$NHCH$_2$CH$_2$SH, (CH$_2$)$_n$NHC(=S)NH$_2$, (CH$_2$)$_n$NH$_2$, (CH$_2$)$_n$N(Me)$_2$, (CH$_2$)$_n$N(Et)$_2$, (CH$_2$)$_n$(iPr)$_2$, CH(CH$_3$)NH$_2$, C(CH$_3$)$_2$NH$_2$, CH$_2$NHCH$_2$CH$_2$NH$_2$, CH$_2$NHCH$_2$CH$_2$NHCH$_2$CH$_2$NH$_2$, CH$_2$N(CH$_2$CH$_2$NH$_2$)$_2$, CH$_2$NHCH$_2$CH$_2$N(CH$_2$CH$_2$NH$_2$)$_2$, CH$_2$N(CH$_2$CH$_2$OH)$_2$, (CH$_2$)$_n$(morpholin-4-yl), (CH$_2$)$_n$(piperidin-1-yl), (CH$_2$)$_n$(4-methypiperazin-1-yl), N(SO$_2$CF$_3$)$_2$, (CH$_2$)$_n$CHO, (CH$_2$)$_n$Si(Me)$_2$H, (CH$_2$)$_n$Si(Et)$_2$H, (CH$_2$)$_n$Si(iPr)$_2$H, (CH$_2$)$_n$Si(tBu)$_2$H, (CH$_2$)$_n$Si(Ph)$_2$H, (CH$_2$)$_n$Si(Ph)(tBu)H, (CH$_2$)$_n$Si(Me)$_2$Cl, (CH$_2$)$_n$Si(Et)$_2$Cl, (CH$_2$)$_n$Si(i-Pr)$_2$Cl, (CH$_2$)$_n$Si(tBu)$_2$Cl, (CH$_2$)$_n$Si(Ph)$_2$Cl, (CH$_2$)$_n$Si(tBu)(Ph)Cl, P(Ph)$_2$, P(o-tolyl)$_2$,

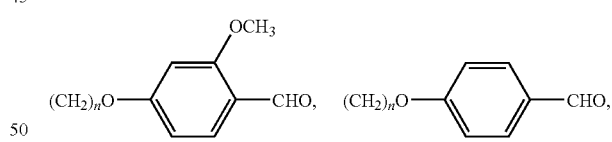

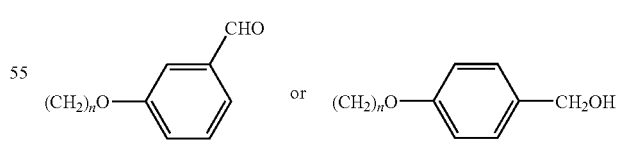

wherein n is zero or an integer from 1 to 5
Y is H, Cl, Br, F, OH, or OMe;
Z is NCO, CO$_2$Me, CO$_2$Et, CO$_2$(i-Pr), CO$_2$(n-Bu), CO$_2$(t-Bu), CN, CO$_2$H, COCl, CO$_2$CH(CF$_3$)$_2$, CO$_2$(pentafluorophenyl), CO$_2$(pentachlorophenyl), CO$_2$Ph, CO$_2$(N-succinimidyl), C(OMe)$_3$, C(OEt)$_2$, CON(OCH$_3$)CH$_3$, CHO, CH$_2$OH, or C(CH$_3$)$_2$OH; and $R^4$ is

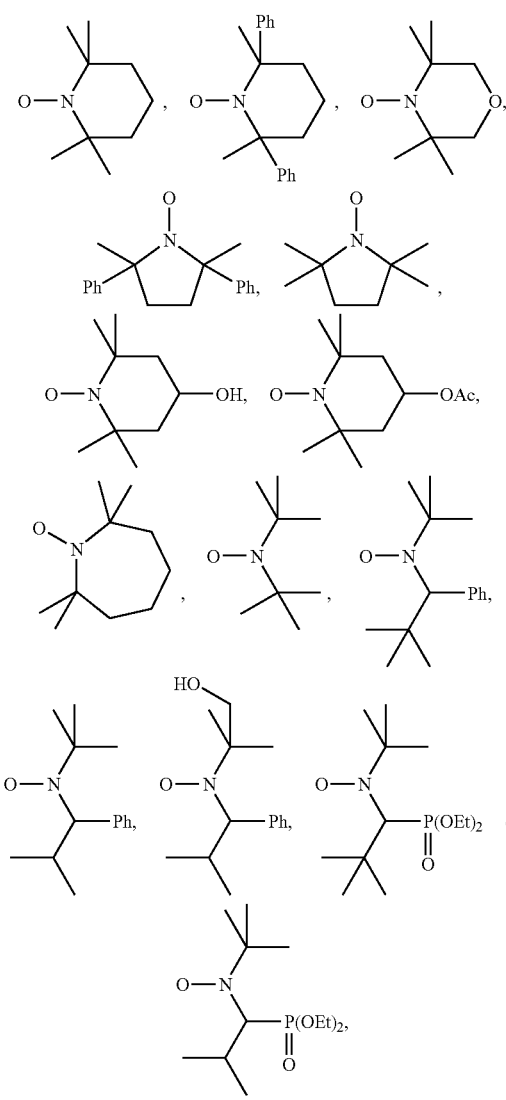

which comprises the step of microwave irradiating a mixture comprising a compound of the formula II

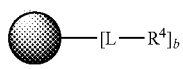    II and a compound III selected from:

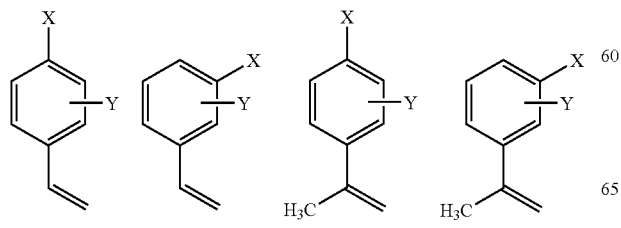

-continued

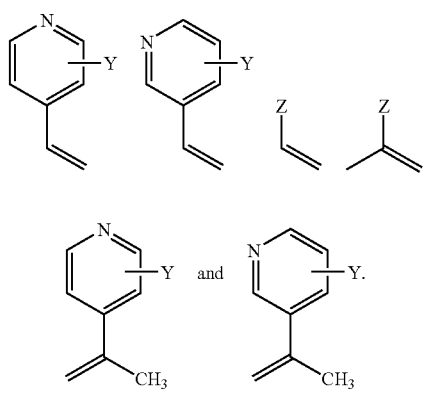

2. The process according to claim 1 wherein $R^4$ is

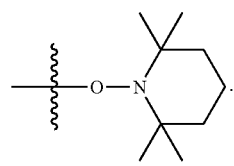

3. A process for the preparation of a compound of the formula IV:

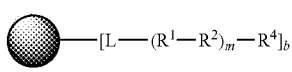    VI wherein

is an insoluble solid support selected from the group consisting of:

poly(styrene-divinylbenzene), macroreticular poly(styrene-divinylbenzene), polystyrene which is radiation grafted to polypropylene, polystyrene which is radiation grafted to polyethylene, polystyrene which is radiation grafted to poly(tetrafluoroethylene), and polystyrene which is radiation grafted to poly (ethylene-tetrafluoroethylene) wherein the insoluble solid support is in a shape selected from a bead, a tube, a rod, a ring, a disk, or a well; L is —$CH_2$—, —$C(CH_3)_2$—, —$CH(CH_3)$—, —$(CH_2)_nCH(CN)$—, —$(CH_2)_nCH(CO_2Me)$-, —$(CH_2)_nCH(Ph)$-, —$(CH_2)_nC(CH_3, Ph)$-, —$CH(CH_2CH_2Ph)$-, or

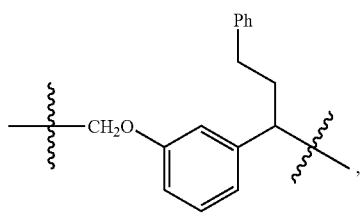

n is zero or an integer from 1 to 5;
m is zero or an integer from 1 to 100;
w is an integer from 1 to 10;
p is zero or an integer from 1 to 10;
b is mMol content of initiator or solid-supported polymer per gram of insoluble solid support and is about 0.1 to about 5.0 mMol per gram;
$R^1$ and $R^2$ are each independently the same or different and are selected from

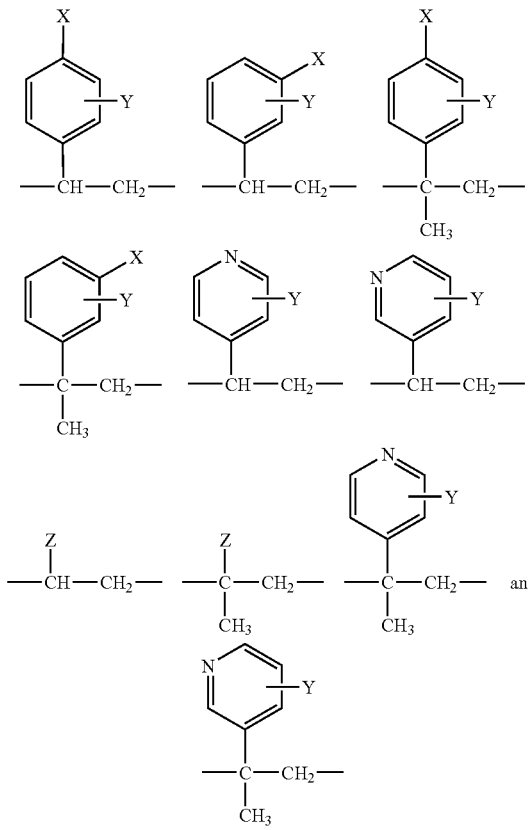

wherein
X is H, F, $(CH_2)_nCl$, $(CH_2)_nBr$, $(CH_2)_nI$, $B(OH)_2$, $(CH_2)_nCH=CH_2$, NCO, $CH_2NCO$, $CH(CH_3)NCO$, $C(CH_3)_2NCO$, $CO_2Me$, $CO_2Et$, $CO_2(t-Bu)$, $CO_2H$, COCl, $CO_2CH(CF_3)_2$, $CO_2Ph$, $CO_2$(pentafluorophenyl), $CO_2$(pentachlorophenyl), $CO_2$(N-succinimidyl), $C(OMe)_3$, $C(OEt)_3$, $(CH_2)_nOH$, $(CH_2)_nCH(OH)CH_2OH$, $(CH_2)_nSH$, $CH_2NHCH_2CH_2SH$, $(CH_2)_nNHC(=S)NH_2$, $(CH_2)_nNH_2$, $(CH_2)_nN(Me)_2$, $(CH_2)_nN(Et)_2$, $(CH_2)_n(iPr)_2$, $CH(CH_3)NH_2$, $C(CH_3)_2NH_2$, $CH_2NHCH_2CH_2NH_2$, $CH_2NHCH_2CH_2NHCH_2CH_2NH_2$, $CH_2N(CH_2CH_2NH_2)_2$, $CH_2NHCH_2CH_2N(CH_2CH_2NH_2)_2$, $CH_2N(CH_2CH_2OH)_2$, $(CH_2)_n$(morpholin-4-yl), $(CH_2)_n$(piperidin-1-yl), $(CH_2)_n$(4-methypiperazin-1-yl), $N(SO_2CF_3)_2$, $(CH_2)_nCHO$, $(CH_2)_nSi(Me)_2H$, $(CH_2)_nSi(Et)_2H$, $(CH_2)_nSi(iPr)_2H$, $(CH_2)_nSi(tBu)_2H$, $(CH_2)_nSi(Ph)_2H$, $(CH_2)_nSi(Ph)(tBu)H$, $(CH_2)_nSi(Me)_2Cl$, $(CH_2)_nSi(Et)_2Cl$, $(CH_2)_nSi(i-Pr)_2Cl$, $(CH_2)_nSi(tBu)_2Cl$, $(CH_2)_nSi(Ph)_2Cl$, $(CH_2)_nSi(tBu)(Ph)Cl$, $P(Ph)_2$, $P(o-tolyl)_2$,

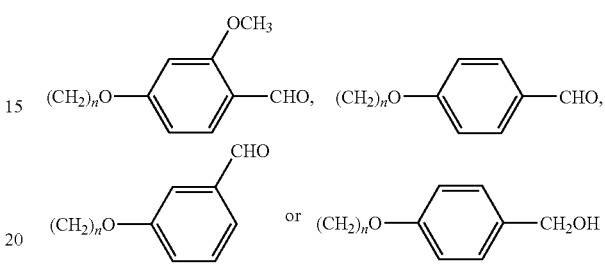

wherein n is zero or an integer from 1 to 5;
Y is H, Cl, Br, F, OH, or OMe;
Z is NCO, $CO_2Me$, $CO_2Et$, $CO_2$(i-Pr), $CO_2$(n-Bu), $CO_2$(t-Bu), CN, $CO_2H$, COCl, $CO_2CH(CF_3)_2$, $CO_2$(pentafluorophenyl), $CO_2$(pentachlorophenyl), $CO_2Ph$, $CO_2$(N-succinimidyl), $C(OMe)_3$, $C(OEt)_2$, $CON(OCH_3)CH_3$, CHO, $CH_2OH$, or $C(CH_3)_2OH$; and
$R^4$ is

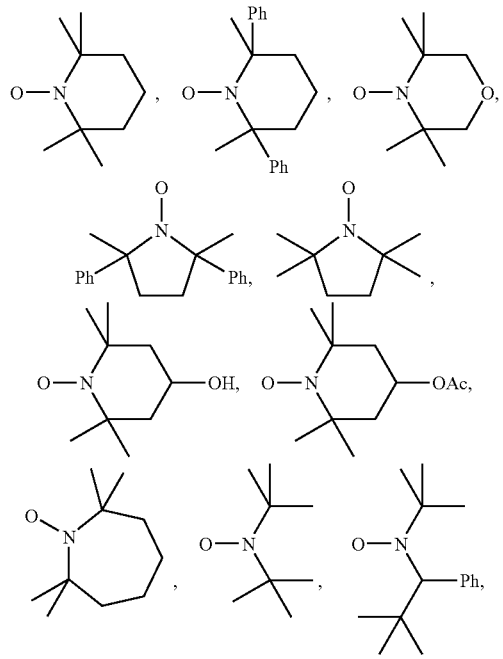

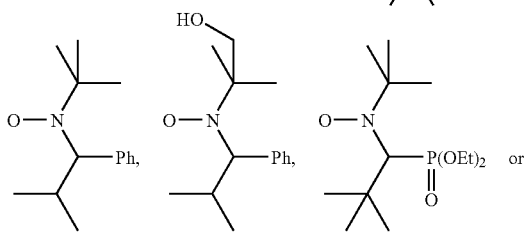

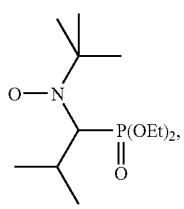

which comprises the step of microwave irradiating a mixture comprising a compound of the formula II

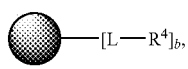

II a compound III selected from:

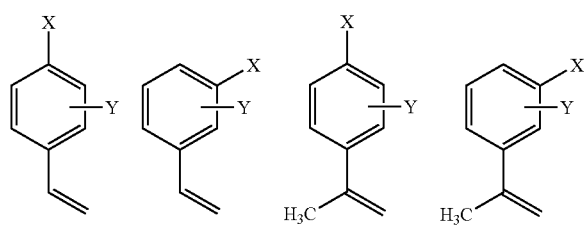

and a compound V selected from:

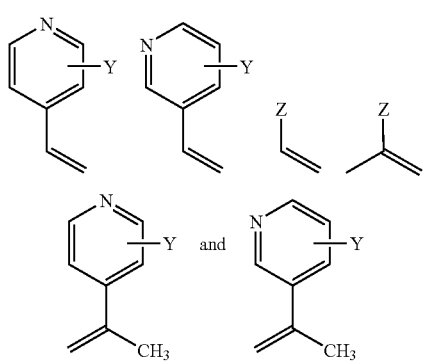

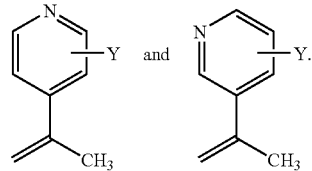

4. The process according to claim 3 wherein $R^4$ is

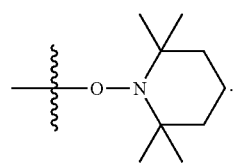

5. A process for the preparation of a compound of the formula VI:

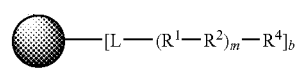

VI wherein is an insoluble solid support selected from the group consisting of:

poly(styrene-divinylbenzene), macroreticular poly(styrene-divinylbenzene), polystyrene which is radiation grafted to polypropylene, polystyrene which is radiation grafted to polyethylene, polystyrene which is radiation grafted to poly(tetrafluoroethylene), and polystyrene which is radiation grafted to poly(ethylene-tetrafluoroethylene) wherein the insoluble solid support is in a shape selected from a bead, a tube, a rod, a ring, a disk, or a well; L is —$CH_2$—, —$C(CH_3)_2$—, —$CH(CH_3)$—, —$(CH_2)_nCH(CN)$—, —$(CH_2)_nCH(CO_2Me)$-, —$(CH_2)_nCH(Ph)$-, —$(CH_2)_nC(CH_3, Ph)$-, —$CH(CH_2CH_2Ph)$-, or

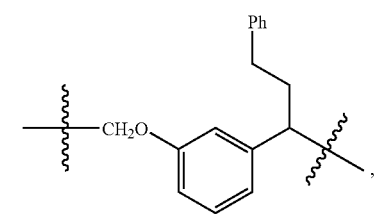

n is zero or an integer from 1 to 5;
m is zero or an integer from 1 to 100;
w is an integer from 1 to 10;
p is zero or an integer from 1 to 10;

b is mMol content of initiator or solid-supported polymer per gram of insoluble solid support and is about 0.1 to about 5.0 mMol per gram;

$R^1$ is selected from

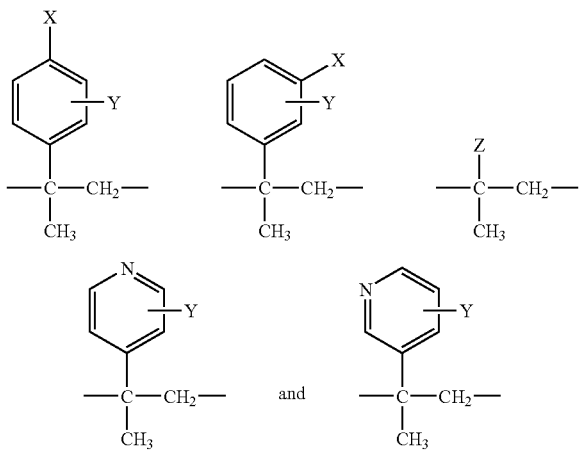

$R^2$ is selected from

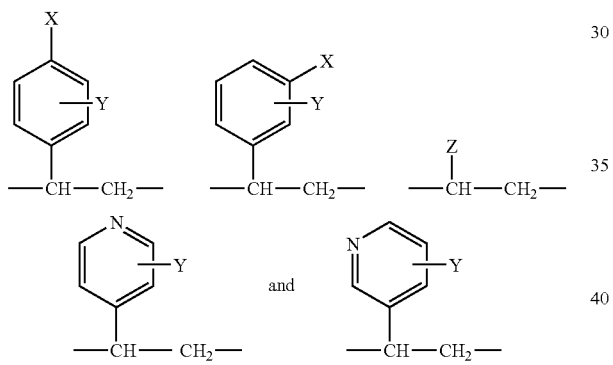

wherein

X is H, F, $(CH_2)_nCl$, $(CH_2)_nBr$, $(CH_2)_nI$, $B(OH)_2$, $(CH_2)_nCH=CH_2$, NCO, $CH_2NCO$, $CH(CH_3)NCO$, $C(CH_3)_2NCO$, $CO_2Me$, $CO_2Et$, $CO_2(t-Bu)$, $CO_2H$, COCl, $CO_2CH(CF_3)_2$, $CO_2Ph$, $CO_2$(pentafluorophenyl), $CO_2$(pentachlorophenyl), $CO_2$(N-succinimidyl), $C(OMe)_3$, $C(OEt)_3$, $(CH_2)_nOH$, $(CH_2)_nCH(OH)CH_2OH$, $(CH_2)_nSH$, $CH_2NHCH_2CH_2SH$, $(CH_2)_nNHC(=S)NH_2$, $(CH_2)_nNH_2$, $(CH_2)_nN(Me)_2$, $(CH_2)_nN(Et)_2$, $(CH_2)_n(iPr)_2$, $CH(CH_3)NH_2$, $C(CH_3)_2NH_2$, $CH_2NHCH_2CH_2NH_2$, $CH_2NHCH_2CH_2NHCH_2CH_2NH_2$, $CH_2N(CH_2CH_2NH_2)_2$, $CH_2NHCH_2CH_2N(CH_2CH_2NH_2)_2$, $CH_2N(CH_2CH_2OH)_2$, $(CH_2)_n$(morpholin-4-yl), $(CH_2)_n$(piperidin-1-yl), $(CH_2)_n$(4-methypiperazin-1-yl), $N(SO_2CF_3)_2$, $(CH_2)_nCHO$, $(CH_2)_nSi(Me)_2H$, $(CH_2)_nSi(Et)_2H$, $(CH_2)Si(iPr)_2H$, $(CH_2)_nSi(tBu)_2H$, $(CH_2)_nSi(Ph)_2H$, $(CH_2)_nSi(Ph)(tBu)H$, $(CH_2)_nSi(Me)_2Cl$, $(CH_2)_nSi(Et)_2Cl$, $(CH_2)_nSi(i-Pr)_2Cl$, $(CH_2)_nSi(tBu)_2Cl$, $(CH_2)_nSi(Ph)_2Cl$, $(CH_2)_nSi(tBu)(Ph)Cl$, $P(Ph)_2$, $P(o-tolyl)_2$,

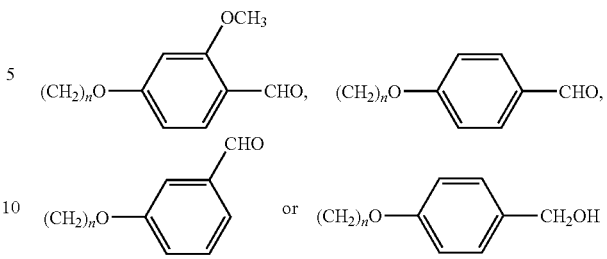

wherein n is zero or an integer from 1 to 5;
Y is H, Cl, Br, F, OH, or OMe;
Z is NCO, $CO_2Me$, $CO_2Et$, $CO_2(i-Pr)$, $CO_2(n-Bu)$, $CO_2(t-Bu)$, CN, $CO_2H$, COCl, $CO_2CH(CF_3)_2$, $CO_2$(pentafluorophenyl), $CO_2$(pentachlorophenyl), $CO_2Ph$, $CO_2$(N-succinimidyl), $C(OMe)_3$, $C(OEt)_2$, $CON(OCH_3)CH_3$, CHO, $CH_2OH$, or $C(CH_3)_2OH$; and $R^4$ is

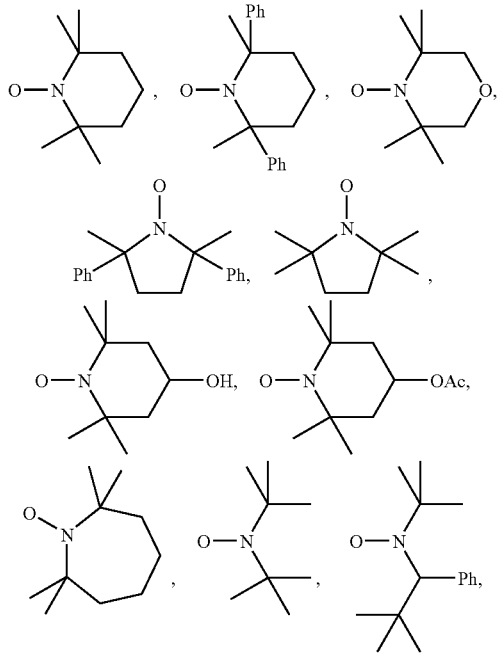

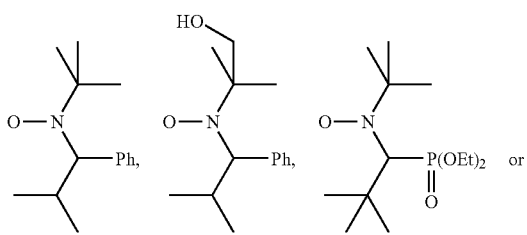

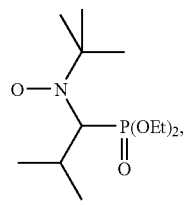

which comprises the step of microwave irradiating a mixture comprising a compound of the formula II

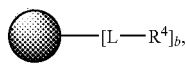

a compound VII selected from:

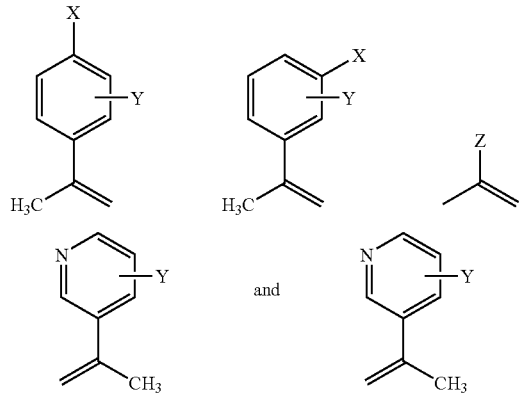

and a compound VIII selected from:

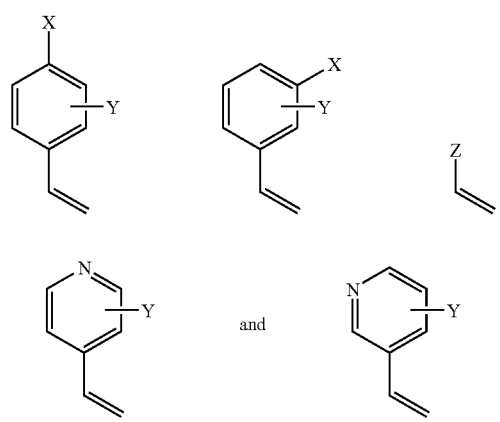

wherein the ratio of the compound VII and the compound VIII is about 2:1.

6. The process according to claim 5 wherein $R^4$ is

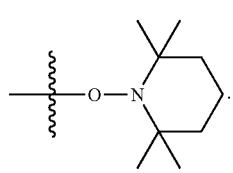

7. A compound which is selected from:

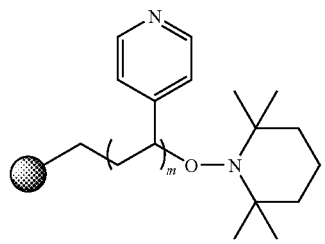

wherein

is a polystyrene resin, m is from 1 to 100 and the pyridyl content is from about 5 to about 7 mmol/gram of resin;

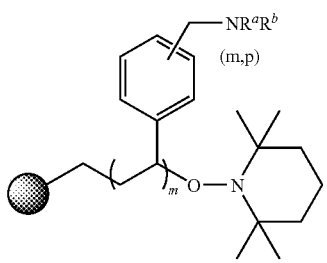

wherein

is a polystyrene resin, m is from 1 to 100, —$NR^aR^b$ is selected from diethylamino, diisopropylamino, piperidinyl, morpholino and piperazinyl and the amine content is from about 4 to about 7 mmol/gram of resin;

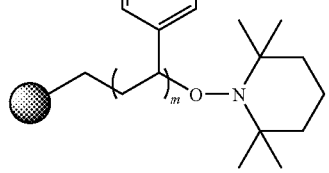

wherein

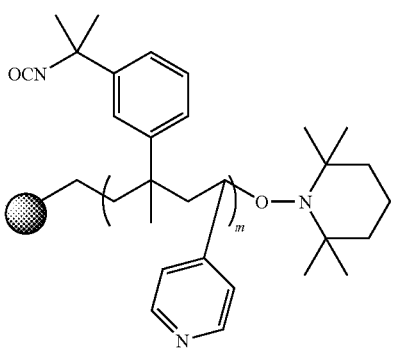

is a polystyrene resin, m is from 1 to 100, and the amine content is from about 3 to about 6 mmol/gram of resin; and wherein

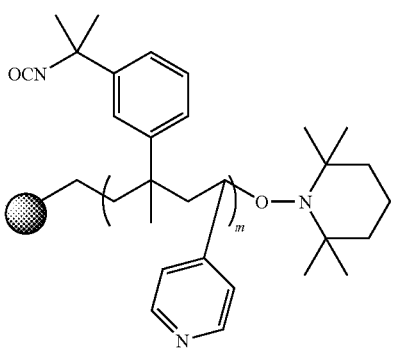

is a polystyrene resin, m is from 1 to 100, and the isocyanate content is from about 1 to about 4 mmol/gram of resin.

8. The compound according to claim 7 which is

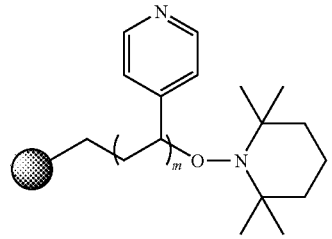

wherein is a polystyrene, resin, m is from 1 to 100 and the pyridyl content is from about 5 to about 7 mmol/gram of resin.

9. The compound according to claim 7 which is

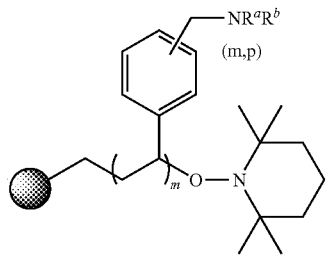

wherein is a polystyrene resin, m is from 1 to 100, —NR$^a$R$^b$ is selected from diethylamino, diisopropylamino, piperidinyl, morpholino and piperazinyl and the amine content is from about 4 to about 7 mmol/gram of resin.

10. The compound according to claim 7 which is

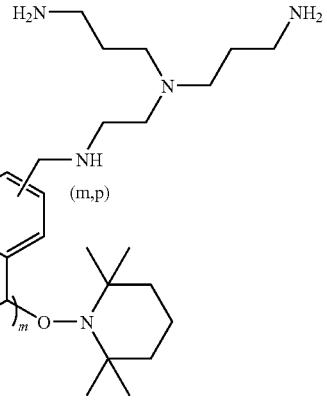

wherein is a polystyrene resin, m is from 1 to 100, and the amine content is from about 3 to about 6 mmol/gram of resin.

11. The compound according to claim 7 which is
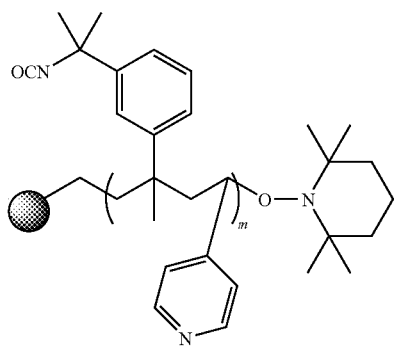
wherein
is a polystyrene resin, m is from 1 to 100, and the isocyanate content is from about 1 to about 4 mmol/gram of resin.
* * * * *